United States Patent [19]

Chorney

[11] 4,143,664
[45] Mar. 13, 1979

[54] CORN CUTTER JAM CLEARING SYSTEM

[75] Inventor: Peter L. Chorney, Hoopeston, Ill.

[73] Assignee: FMC Corporation, San Jose, Calif.

[21] Appl. No.: 844,008

[22] Filed: Oct. 20, 1977

Related U.S. Application Data

[63] Continuation of Ser. No. 707,801, Jul. 22, 1976, abandoned.

[51] Int. Cl.² .............................................. A01F 11/06
[52] U.S. Cl. .................................................... 130/9 A
[58] Field of Search ............................ 130/9 A–9 F; 198/33, 110, 16 R; 83/37

[56] References Cited

U.S. PATENT DOCUMENTS

| | | | |
|---|---|---|---|
| 1,090,988 | 3/1914 | Jones | 130/9 A |
| 2,767,716 | 10/1956 | Cover | 130/9 A |
| 2,787,273 | 4/1957 | Kerr | 130/9 B |
| 2,797,793 | 7/1957 | Wilde et al. | 198/110 |
| 3,409,116 | 11/1968 | O'Malley | 198/33 |
| 3,455,307 | 7/1969 | Ross et al. | 130/9 R |
| 3,604,296 | 9/1971 | Sarka | 83/37 |
| 3,913,723 | 10/1975 | Johnson | 198/16 R |

*Primary Examiner*—Russell R. Kinsey
*Attorney, Agent, or Firm*—John F. Verhoeven

[57] ABSTRACT

A corn kernel cutter of known design has a rotating head upon which cutting knives are pivoted and which mounts a shiftable ring that makes a pin and slot connection with the knives so that they open and close simultaneously. The knives are formed with counterweights which urge their cutting edges inwardly during normal operation. The corn cutter has conventional opposed sets of feed rollers which receive the ears smaller end first from a cutter feeder conveyor. A sensor switch is actuated by opening of the entry feed rollers by an ear and is connected to a control circuit including time delay relays. When the entrance of an ear is first sensed by the feed rollers, a reverse time delay relay is energized and if the corn is cut and clears the sensor feed rollers in normal fashion, the reverse time delay relay has no effect. If an ear of corn becomes jammed in the cutter long enough for the reverse time delay relay to time out, a control circuit reverses the drive to the cutter head, the feed rollers and the conveyor, which withdraws the jammed ear from the cutter. After the elapse of a short period of time, a forward time delay relay operates to again drive the machine in a forward direction and the ear is re-presented to the cutter. This forward and reverse action takes place over three cycles, after which the control circuit stops the machine, in case the ear has not passed through the cutter. Upon reversing of the drive, the direction of cutter head rotation is such that the reverse acceleration of the knife pivots and the inertia of the knife counterweights sets up a force couple that causes the knife cutting edges to automatically retract from the jammed ear during acceleration of the cutting head in the reverse direction, so that no added mechanical devices are required in the cutter head for opening the knives and clearing the jammed ear.

16 Claims, 16 Drawing Figures

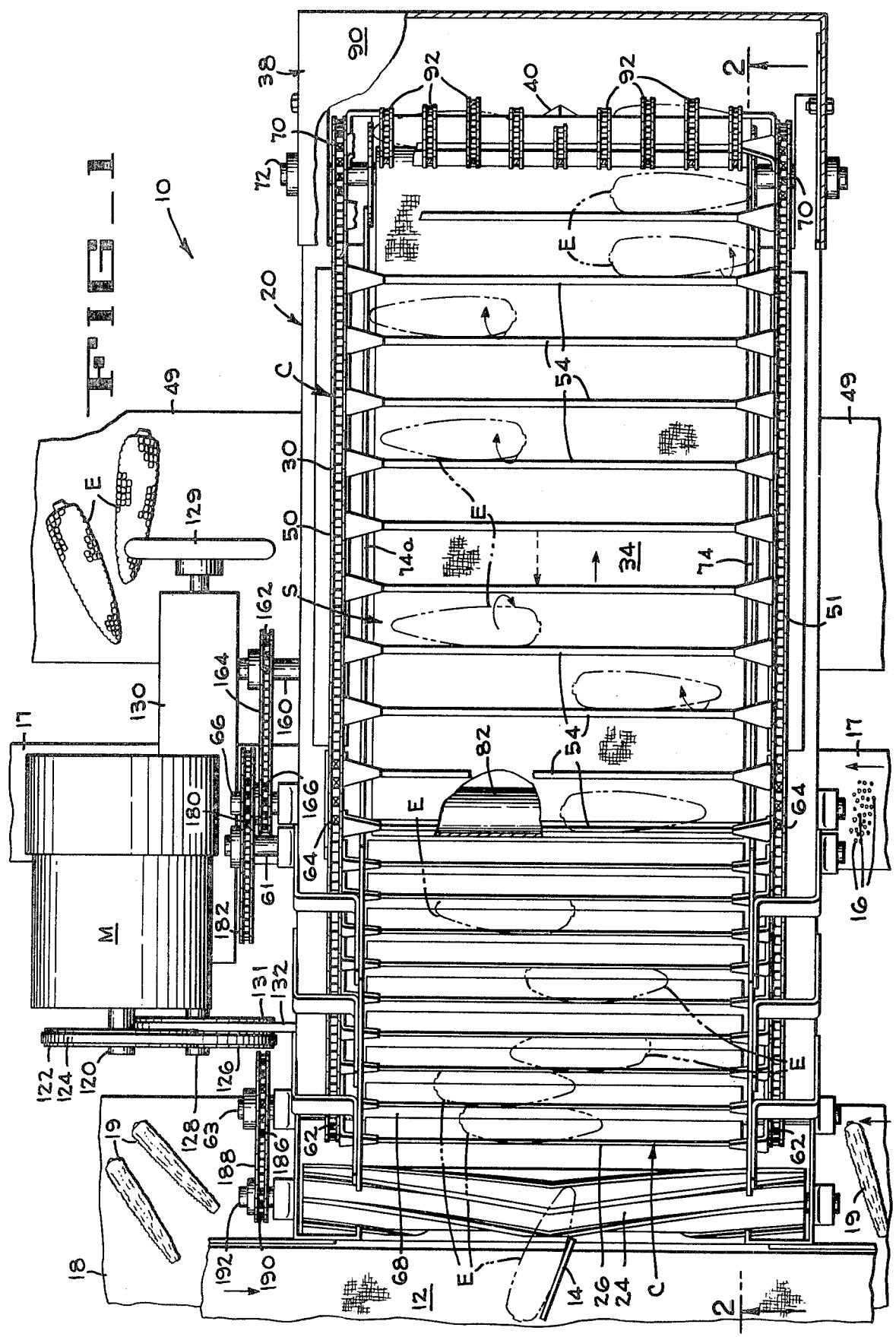
FIG_1

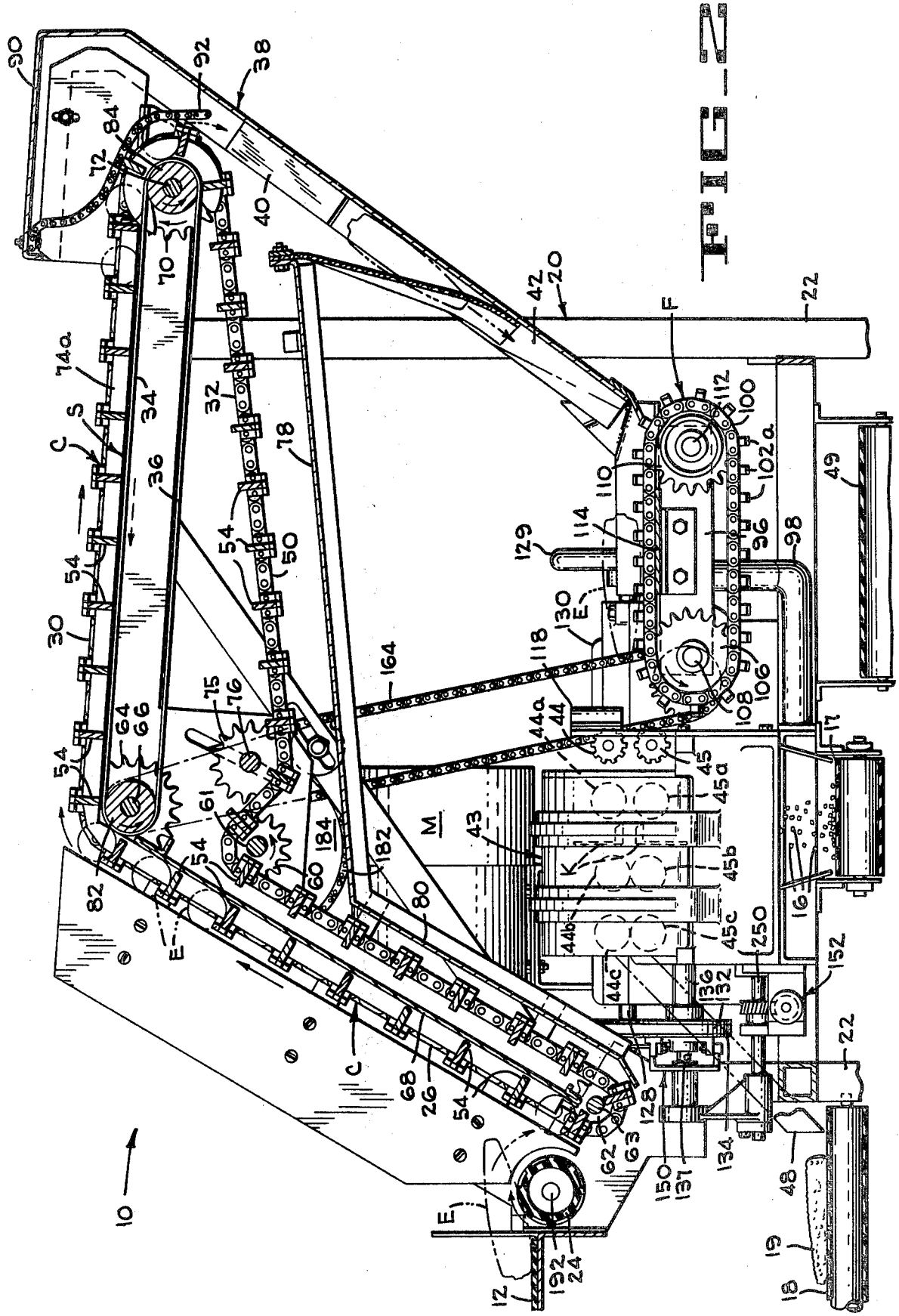

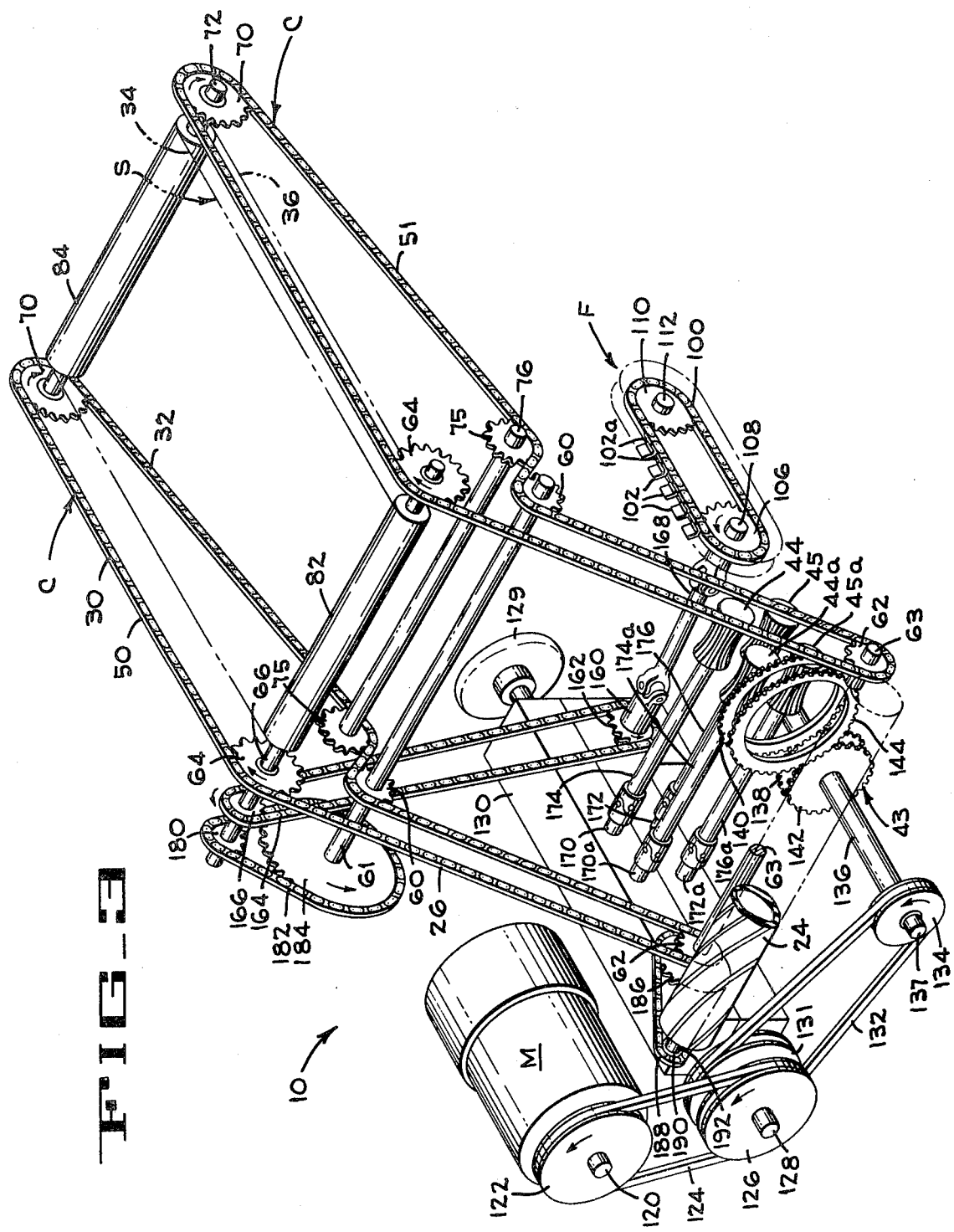

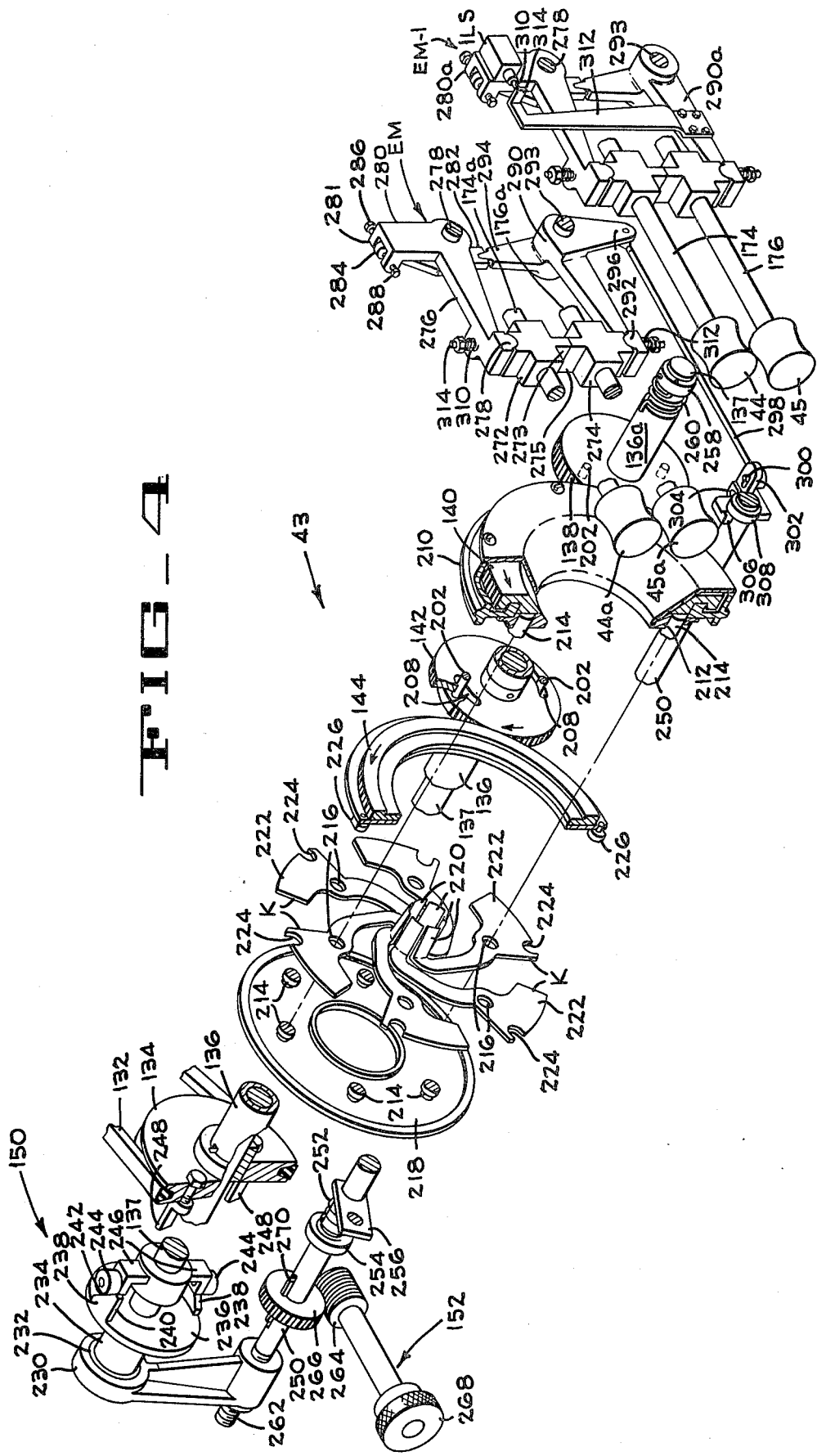

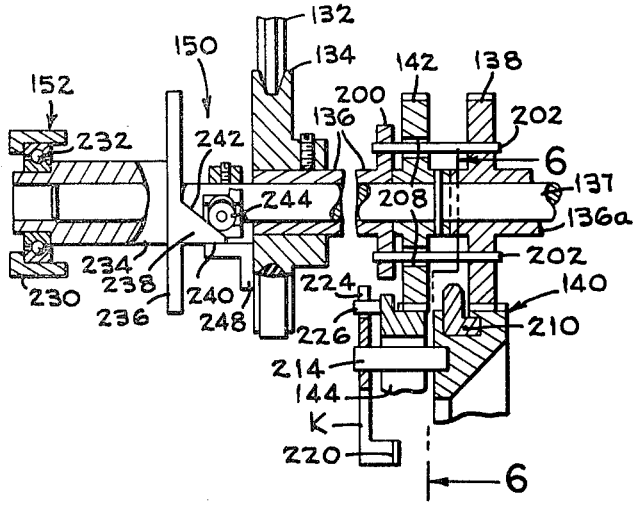
FIG_5 MACHINE STOPPED
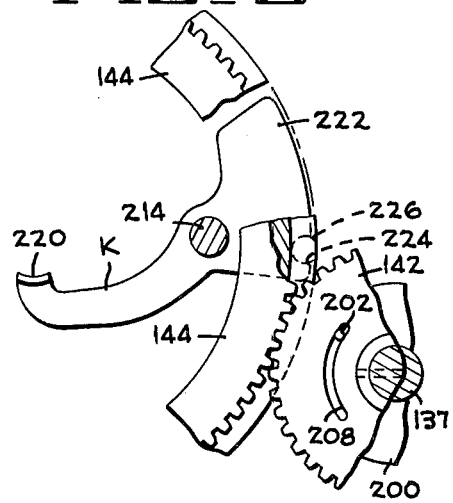
FIG_6
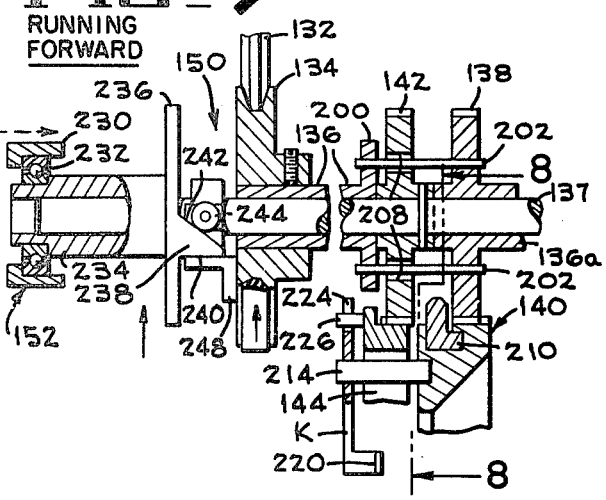
FIG_7 RUNNING FORWARD
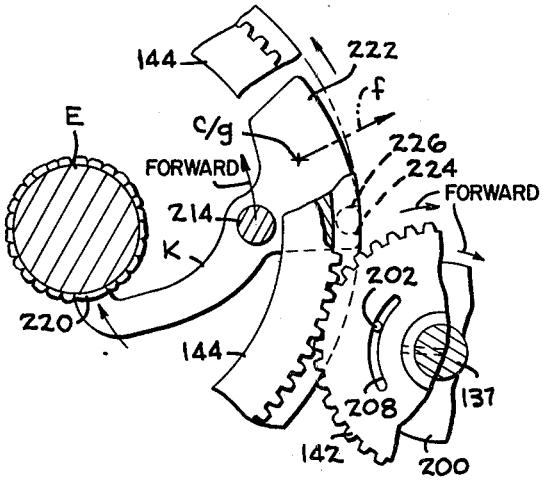
FIG_8
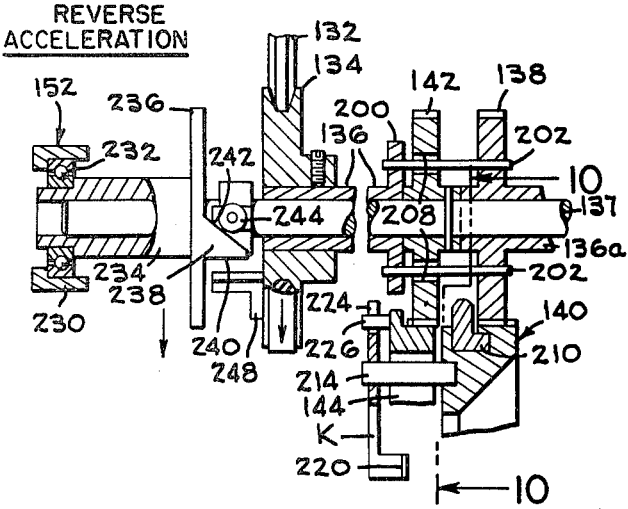
FIG_9 REVERSE ACCELERATION
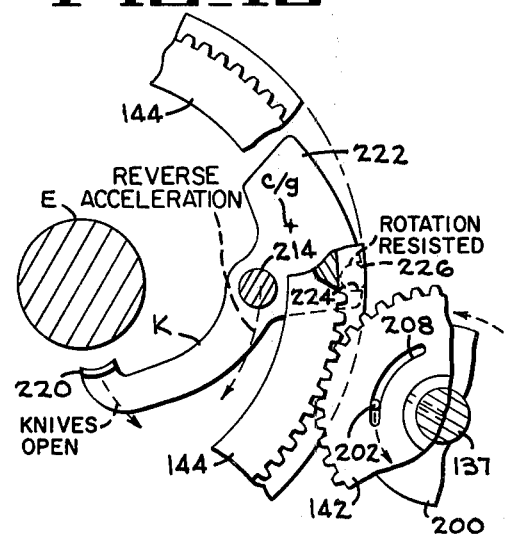
FIG_10

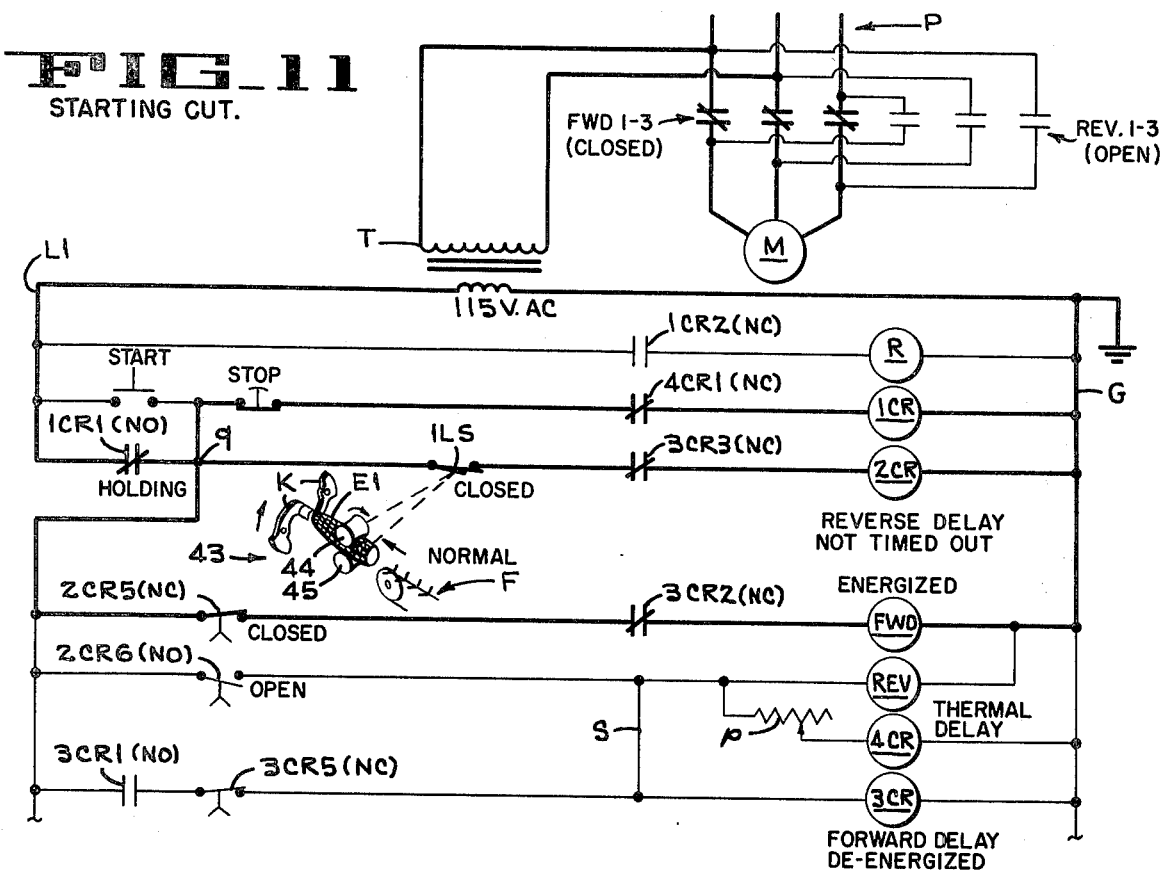
FIG_11 STARTING CUT.
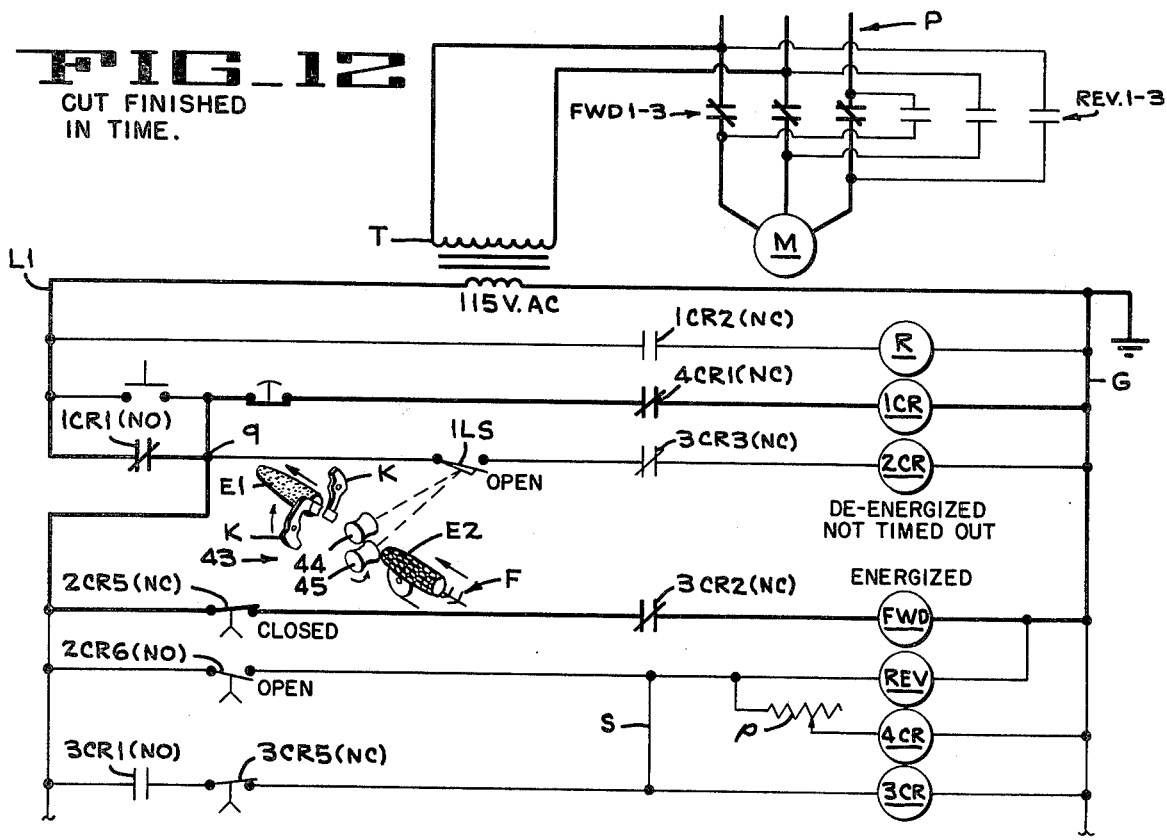
FIG_12 CUT FINISHED IN TIME.

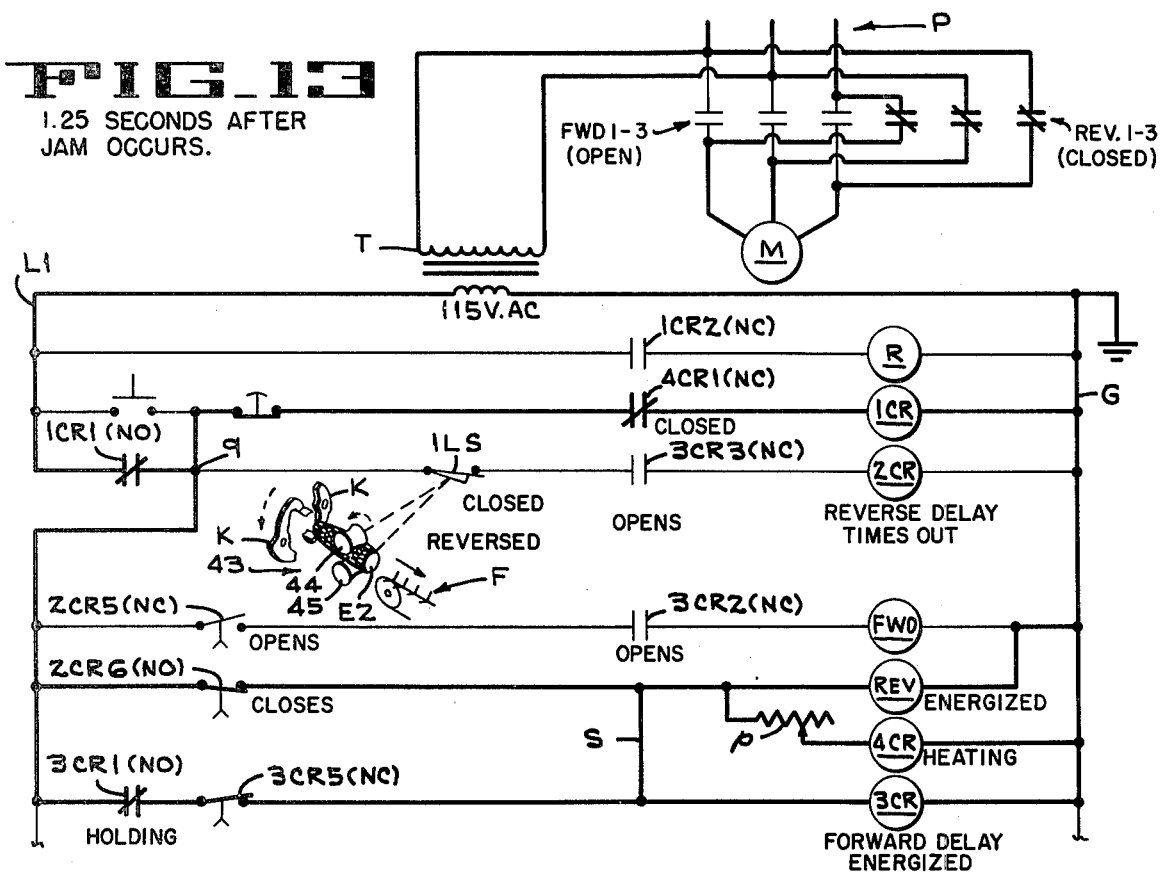
FIG_13
1.25 SECONDS AFTER JAM OCCURS.
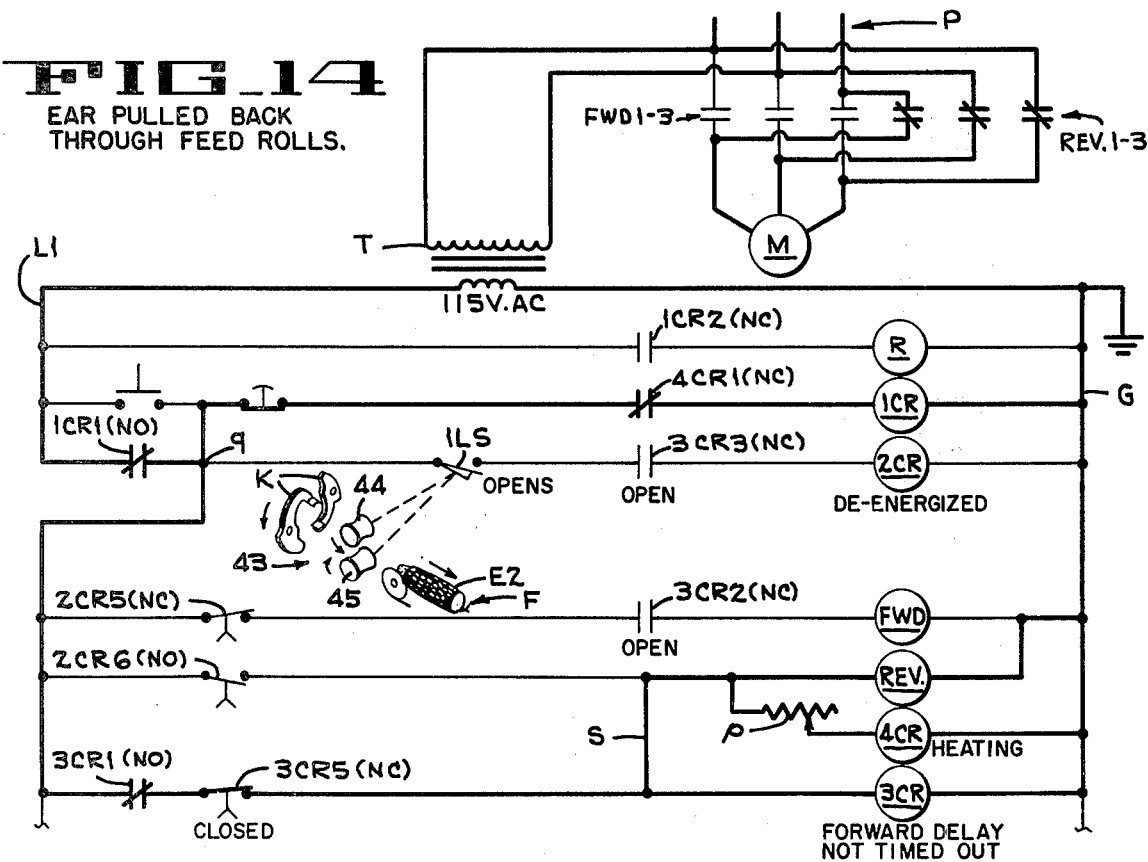
FIG_14
EAR PULLED BACK THROUGH FEED ROLLS.

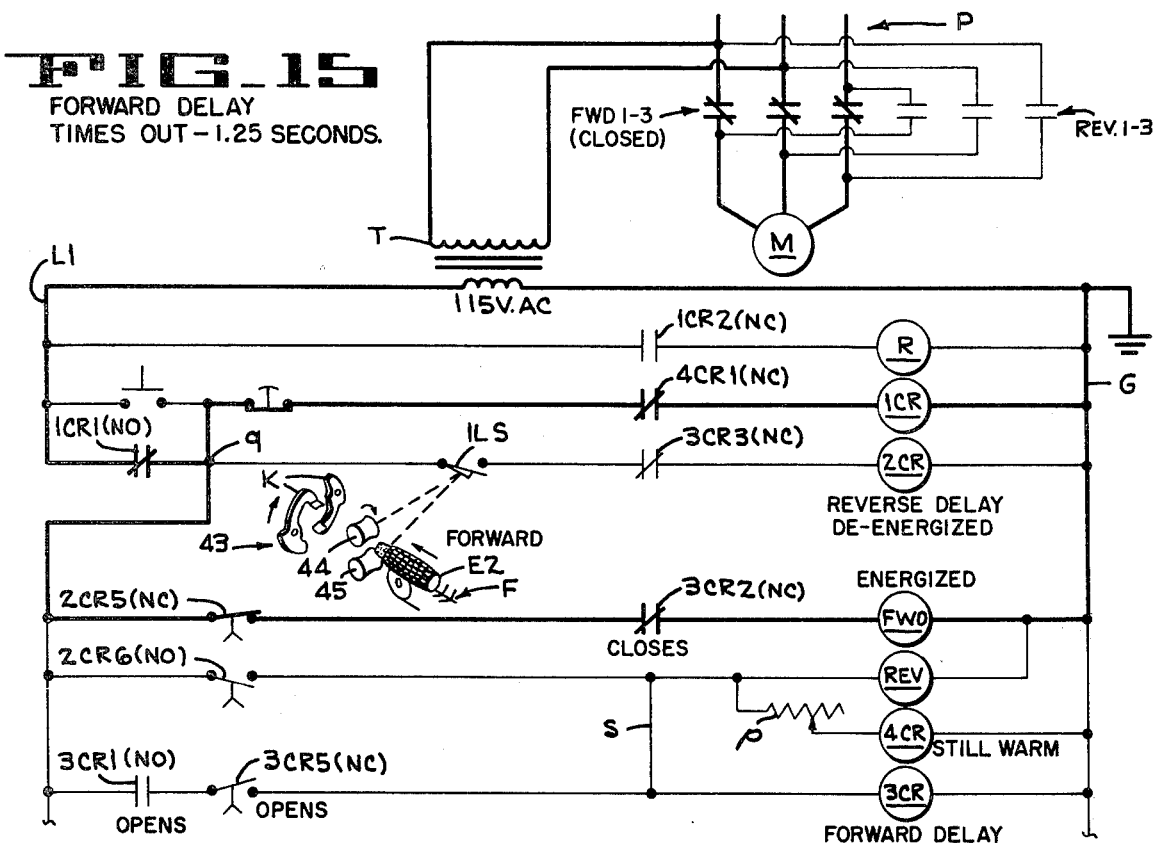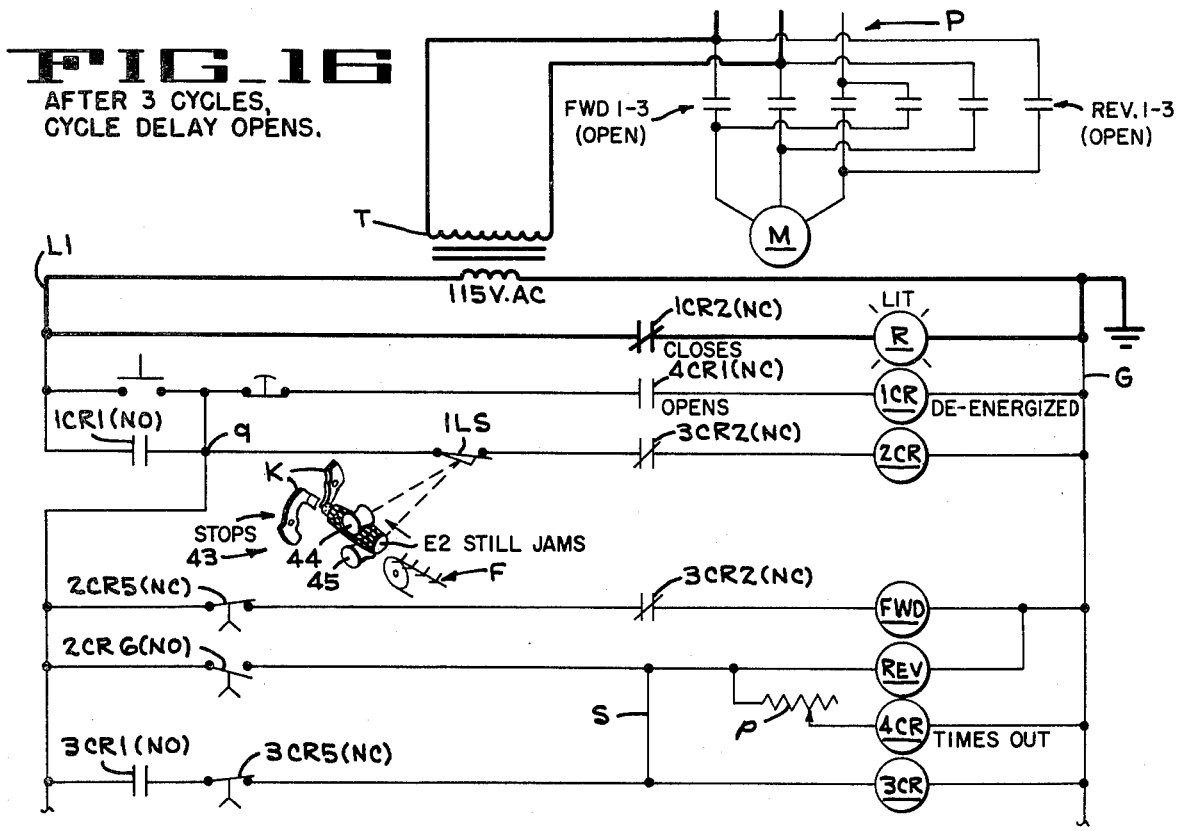

CORN CUTTER JAM CLEARING SYSTEM

This is a continuation, of application Ser No. 707,801 filed July 22, 1976 and now abandoned

REFERENCE TO RELATED APPLICATIONS

The corn cutter feeder (excluding the jam clearing system) disclosed herein forms the subject matter of the copending application of Chamberlain Ser. No. 705,374 filed July 14, 1976, and assigned to the FMC Corporation.

Field of the Invention

This invention relates to corn shellers, and more particularly to a system for clearing jams that occur in sweet corn kernel cutting machines.

Description of Prior Art

The U.S. Pat. to Ross et al No. 3,455,307 issued July 15, 1969, shows a driven chain conveyor for delivering ears to a corn cutter head similar to that of the present invention except that the knives are not shown as having counterweights. The cutter head mounts an independently rotatable ring, corresponding in part to that of a conventional cutter, that has a pin and slot connection with each knife so that rotation of the ring relative to the head can open and close the knives. The aforesaid ring can be rotated in a direction to open the cutting knives by an axially moveable cam structure which includes a cam ring that can be pushed axially inwardly by push arms under control of an operating arm and a solenoid, to operate a cam follower on the ring. The delivery of an ear to the cutter is detected by a sensor that is connected to a control circuit which includes time delays and a relay that energizes the solenoid for mechanically opening the cutter knives. The relay also opens contacts for simultaneously opening a clutch in the drive to the chain conveyor upon elapse of a predetermined length of time after the jammed ear was first sensed by the sensor.

The U.S. Pat. to Kerr No. 2,323,092, June 29, 1943, discloses a corn cutter having counterweighted knives and a knife control ring with a pin and slot connection with the knives for controlling the knife opening. Adjustable tension tangential springs urge the control ring in a direction that closes the knives (FIG. 9) and the effect of the springs is augmented by the counterweights on the knives. The Kerr patent also discloses a chain conveyor for delivering ears and feed rollers which are driven along with the cutter head and which are interconnected to open with an equalizing motion by an entering ear of corn.

The U.S. Pat. to Schmidt No. 2,214,285, Sept. 10, 1940, discloses a corn cutting apparatus having counterweighted knives and a knife shifting ring that makes a bell crank connection with the pin and slot connection knife control ring. The knife shifting ring is mechanically connected to the feed rollers to open the knives in accordance with the diameter of an ear of corn as sensed by rollers, employing an operating track and axially shiftable ring structure similar to that of the aforesaid Ross et al patent. The U.S. Pat to Schmidt No. 2,034,993, Mar. 24, 1926, shows a corn cutter head having pivoted counterweighted knives and a knife control ring which is urged in a knife closing direction by tangential springs (FIG. 12). The knife opening is controlled by rotating ear sensing fingers (FIG. 10).

The U.S. Pat. to Kerr No. 2,787,273, Apr. 2, 1957, shows a corn cutting head which is similar to that of the present invention, except that ear gauging fingers are employed instead of employing the feed rollers as gauges. This Kerr patent discloses a corn cutter having counterweighted knives pivoted on a rotating cutter head and making a pin and slot connection with a knife control ring gear. The knife control ring gear is meshed with a knife adjusting gear that is attached to a shaft that normally rotates with another gear that drives the corn cutter head but the knife adjusting gear can move relatively to the cutter head drive gear, due to a pin and slot connection between concentric shafts, as shown in FIG. 4. The shaft of the knife adjusting gear 214 mounts a cam roller which can cause rotation of the knife adjusting gear relative to the cutter head drive gear by the axial positioning of a cam plate that is rotated in one direction with the gears. The cam plate can be axially shifted by a push rod which in turn can be shifted by the ear gauging fingers 270, as best seen in FIG. 8. The spreading apart of the interconnecting ear gauging fingers by the entry of an ear of corn moves the cam plate towards the cutter head to independently rotate the cam follower rollers 260 and the knife adjusting gear in such a direction as to cause the knives to open further. The cam follower 260 is urged against the adjusting cam 254 by a torsion spring 230 connected to the shaft upon which the cam follower is mounted. Thus, the torsion spring 230 resiliently urges the knives toward their closed direction and centrifugal force acting on the counterweights of the knives urge the knives toward their closed position upon rotation of the cutting head. The degree to which the knives are initially opened is controlled by the spreading of the gauging fingers by an ear of corn (FIG. 8).

The U.S. Pat. to Childers No. 3,295,532, Jan. 3, 1967, shows a corn cutting machine similar to that of the aforesaid Kerr U.S. Pat. No. 2,787,273 with the improvement wherein the spring force tending to close the knives can be adjusted while the cutter is running.

The U.S. Pat. to Jones No. 1,090,988, issued Mar. 24, 1914, discloses a green corn cutting machine having a manually operated lever for releasing the force of springs that urge the feed rollers towards their closed position in order to facilitate removal of a jammed ear.

The U.S. Pat. to Cover No. 2,767,716, issued Oct. 23, 1956, shows a feed wing gate structure for dropping ears of corn in front of a pusher that delivers them to a corn cutter. The patent is directed to structure for preventing the opening of feed wings that drop a new ear of corn into the pusher assembly, in case the previous ear of corn becomes jammed.

The U.S. Pat. to Wilde et al No. 2,797,793, issued July 2, 1957, relates to a safety device for a blueprint machine. The prints are fed between upper and lower feed belts with the lower feed belt having a deflectable upper reach under the feed roller of the upper feed belt. Beneath this deflectable reach is a pivoted arm and plunger unit which, when depressed, operates a switch for reversing the drive motor to the feed mechanism. If an operator's hand is caught between the upper roller and the deflectable lower feed belt reach, the switch reverses the motor until his hand is withdrawn, after which forward drive of the feed belts is reestablished. This feeding mechanism would reverse any time articles that are substantially thicker than a sheet of paper reaches the feed belts.

The U.S. Pat. to O'Malley, No. 3,041,996, issued Nov. 6, 1968, discloses a notched transfer wheel for turning electronic modules 90°, with anti-jam means. The notched transfer wheel is driven from a hub through a releasable detent and the hub also drives a counter rotating de-jam wheel having a lug thereon. In case the transfer wheel is jammed, the detent releases but the driven hub continues to rotate. This brings the lug of the counter-rotating de-jam wheel against a pin on the notched transfer wheel so as to cause the transfer wheel to rotate a short distance in the reverse direction and clear the jam.

The Pat. of Johnson No. 3,913,723, issued Oct. 21, 1925, discloses an escalator structure whereby a microswitch is activated if a piece of clothing is jammed under the landing comb. Actuation of the microswitch reverses the escalator for a period of short time. The escalator must be restarted in a forward direction by maintenance personnel with a special key.

SUMMARY OF THE INVENTION

The cutter head and feed roll assembly employed in the system of the present invention is in and of itself generally like that disclosed in the aforesaid Kerr U.S. Pat. No. 2,787,273. The principle difference between the cutter head assembly of the present invention per se and that of the aforesaid Kerr patent are that the gauging fingers that operate a push rod to open the cutter knives in response to the entering ear of corn are omitted and the push rod is operated by the second set of feed rollers, as has been the practice of the FMC Corporation for some time. Of particular significance however, is that the Kerr patent does not provide an automatic jam clearing system, as does the cutting machine of the present invention.

The cutting machine of the present invention provides a jam responsive and self clearing system which is an improvement over the jam responsive system of the aforesaid U.S. Pat. to Ross et al No. 3,455,307 in two respects. First, instead of merely stopping the chain conveyor and opening the cutting knives in response to the presence of a jammed ear in the cutter head, the system of the present invention automatically reverses the cutter head and elements that feed ears to the head, namely, the feed rollers and the chain conveyor in the embodiment described herein, to withdraw the jammed ear from the cutter head. The system of the present invention then re-establishes forward drive of the conveyor, the feed rollers and the cutter head and re-presents the previously jammed ear to the forwardly rotating cutter head upon the assumption that the previously jammed ear will now pass through the cutter head without requiring any action by the operator. If the previously jammed ear jams again, this reversal and re-presentation of a jammed ear to the cutter head is repeated, but if the jam persists, a cycle time delay relay shuts off the entire machine so that the operator can investigate and correct the difficulty. In a large majority of jams, the machine will clear itself automatically, without need for stopping the machine.

The second improvement over the system of the Ross et al patent is that no additional mechanical structure is required to open the knives. In the system of the present invention, upon occurrence of a jam, the cutter head rotation is not merely stopped, as in Ross et al, it is reversed and the knives open automatically during reverse acceleration of the cutter head. The Ross et al patent requires the addition of a special cam plate and cam structure on the blade adjusting ring to the cutter head for opening the knives. Ross et al also requires thrust arms for the cam plate, an operating arm and a solenoid for operating the thrust arms and the cam plate to open the knives when a jam is sensed.

In accordance with the present invention, the relation of the center of gravity of the knife counterweights to their pivots on the cutter head is such that upon acceleration of the cutter head during reverse, the sum total effects of the moment of inertia of each cutting knife counterweight and its reversely rotating pivot set up a force couple that instantaneously and automatically causes the knives to fly open. This knife opening action, coupled with attendant reversal of the feed rollers and the feed conveyor is sufficient to free the jammed ear of corn so that it can be withdrawn from the cutting head, as previously described, and re-presented thereto a predetermined number of times.

More specifically, the improvement of the present invention includes a control circuit for reversing the direction of the drive for the cutter head, the feed rollers and the delivery conveyor. Also included is a sensor, preferably operated by the feed rollers, connected to the control circuit for sensing the presence of an ear passing through the cutter head.

A reverse time delay is included in the control circuit which is energized and starts to time out when the sensor is first actuated by an ear of corn passing into the corn cutter head. In normal operation, an ear of corn will be cut and will have cleared the feed roller sensor before the reverse time delay times out and therefore the control circuit has no effect on normal forward operation of the system.

In case of a jam, the ear sensor (e.g. feed rollers and switch) remains activated by the jammed ear for a period of time long enough for the reverse time delay relay in the control circuit to time out, whereupon the drive for the cutter head, the feed rollers and the cutter conveyor is reversed to withdraw the jammed ear from the cutter head. The acceleration of the cutter head during the aforesaid reversal of the cutter head causes the cutting knives to fly open long enough to clear the rearwardly moving jammed ear of corn, as previously described. A forward time delay relay is also incorporated in the control circuit and after the unit has been operating in reverse for a predetermined time, the forward time delay re-establishes the normal forward drive to the cutter head, the feed rollers and the cutter conveyor. The forward delay relays the re-establishment of a forward drive until the elapse of a time period that is normally sufficient for the jammed ear to have been withdrawn from the cutting head. When the forward time delay times out, it re-initiates drive in the forward direction and control of the driving motor is restored to the reverse time delay relay, as in normal operation.

To summarize, the jam clearing system of the present invention will automatically reverse the drive to the corn cutter head, the feed rollers and the feed conveyor a predetermined time after occurrence of a jam and reversal of the cutter head will automatically open the knives so that the jammed ear can be withdrawn. No mechanical additions to the standard cutting head are required to cause the knives to open upon reversal of the drive. The system then reverts to normal forward operation and re-presents the jammed ear to the cutter head. If the ear jams again, the system is reversed as before, to withdraw the ear. This cycle of presentation and withdrawal of a jammed ear of corn to the cutter head is permitted to take place for three cycles, whereupon a cycle time delay in the control circuit lights a warning light and stops the entire machine for attention by an operator.

BRIEF DESCRIPTION OF THE DRAWINGS

FIG. 1 is a plan view of a corn cutter feeder embodying the anti-jam features of the present invention.

FIG. 2 is a section taken on line 2—2 of FIG. 1.

FIG. 3 is a diagramatic perspective view of the drive mechanism.

FIG. 4 is an exploded perspective view of the corn cutting head.

FIG. 5 is a simplified horizontal section through a portion of the corn cutting head.

FIG. 6 is a section showing a cutting knife looking along line 6—6 of FIG. 5.

FIG. 7 is a section like FIG. 5 when the cutter is running in its forward direction.

FIG. 8 is a view of a knife looking along line 8—8 of FIG. 7.

FIG. 9 is a section like FIGS. 5 and 7 when reverse acceleration is being imparted to the cutting head.

FIG. 10 is a view of the action of the knife looking along line 10—10 of FIG. 9.

FIGS. 11—16 are sequential diagrammatic operational views of the automatic anti-jam electrical circuit.

GENERAL DESCRIPTION OF A SYSTEM INVOLVING THE INVENTION

Before discussing the automatic jam clearing system of the present invention in detail, the components of that system will be described in connection with an orienter feeder mechanism that supplies ears end-to-end with their pointed ends first to a pointed feeder conveyor for delivering the ears to the corn cutter. The orienting feeder to be described is like that described in detail and forming the subject matter of the copending application of Chamberlain Ser. No. 705,374 filed July 14, 1976 and assigned to the FMC Corporation. It is to be understood that the orienting feeder just referred to is merely described as representative of the feeder which will supply ears of corn to the cutter conveyor feeder; that the details of the orienting feeder are not critical to the present invention and that other means for supplying corn to the corn cutter feeder can be employed in conjunction with the mode of operation and principles of the jam clearing system of the present invention.

Referring to FIGS. 1 and 2 a corn cutter feeder embodying the jam clearing system of the present invention is designated generally at 10. In many installations, more than one of these feeders is provided where thay are aligned in a row and fed with husked ears of corn E by a feeder conveyor 12. At each feeder 10 a diverter construction, such as the element 14 illustrated in FIG. 1 and well known in the art, diverts a certain percentage of the incoming ears on the conveyor 12 into the feeder 10. The kernels 16 of corn cut from the ears drop out of the cutter housing and are carried away by a delivery conveyor 17 which removes the cut kernels for processing. A take-away conveyor 18 removes the cobs 19 from which the kernels have been cut.

The feeder 10 has a framework illustrated generally at 20 which includes frame and leg structure 22 for supporting the feeder on the floor. The ears E are introduced to the feeder from the conveyor 12 by a rubber covered, ribbed roller 24 which feeds into a flight conveyor indicated generally at C. The flight conveyor C has an elevating reach 26, a slightly downwardly inclined preorienting reach 30 and an angled return reach 32.

Beneath the preorienting reach 30 of the flight conveyor C is a preorienting or spinning belt, indicated generally at S, and having an upper spinning reach 34, which moves oppositely to the preorienting reach 30 of the conveyor C, as in the Ross et al patent 3,394,805, July 30, 1968. The belt S has a return reach 36. Along the preorienting reach 30, the ears of corn are formed in two lanes with the smaller ends of the ears of each lane on the outside (FIG. 1). The preoriented ears are dropped off the ends of the conveyors C and S onto a slide plate 38 whereupon the butts of each lane strike a V-shaped butt deflector 40, which is seen in FIGS. 1 and 2, and which forms subject matter for the aforesaid Chamberlain application. The butt deflector 40 initiates the final orientation which causes the ears of each lane to fall small end first down a chute 42 onto a cutter feeder conveyor F. The conveyor F feeds the ears small end first to a corn cutter assembly 43 having main cutting knives K. In order to assist the feeding of the ears from the conveyor F into the corn cutter, two sets of driven feed rollers are disposed ahead of the main cutter knives K. As seen in FIG. 2, these include an upper entrance roller 44 and an opposed lower lower rollers 45 which control the reversing system, and a second set of rollers 44a, 44b, which are connected to a cutter control system to be described. Other sets of feed rollers 44b, 45b and 44c, 45c are provided at the delivery side of the knives K. A preferred embodiment of the corn cutter 43 will be described in detail presently. Basically it is of a known commerical design, such as the Model 3AR corn cutter manufactured by the FMC Corporation. The details of similar cutters are shown in the aforesaid U.S. Pat. Nos. to Kerr 2,323,092, June 29, 1943, Kerr 2,787,273, Apr. 2, 1957 and in Schmidt 2,034,993, Mar. 24, 1936. These cutters are manufactured so that they can have both kernel cutting knives and scraping knives. In the installation of the present invention, only the kernel cutting knives, shown at K in dotted lines of FIG. 2, are provided. The cobs delivered from the exit end of the cutter are disposed of in any convenient manner such as by chute 48, shown partially in phantom in FIG. 2. That directs the cob to the aforementioned takeaway conveyor 18. A conveyor 49 (FIG. 2) is disposed beneath the feeder conveyor F and receives any ears that fall off that conveyor and returns them to the feeder conveyor 12 for recirculation, in a manner known in the art.

THE FLIGHT CONVEYOR

The flight conveyor C includes laterally spaced side chains 50, 51 (FIG. 1) which mount longitudinally spaced flight bars 54. The details of the drives for flight conveyor C and for the spinning belt S are not critical to the present invention and will be mentioned briefly later relative to FIG. 3.

Referring at this time principally to FIG. 2, the return reaches 32 of the side chains 50, 51 of the flight conveyor C pass over spaced drive sprockets 60 on a drive shaft 61. From the sprockets 60 the return reach passes around spaced lower idler sprockets 62 keyed to a shaft 63.

The conveyor C then proceeds along the elevating reach 26 and each side chain passes over an idler sprocket 64 freely mounted on a shaft 66. Beneath the elevating reach 26 of the conveyor C is disposed a support plate 68 (FIG. 2) which supports the ears of corn as they are pushed up the plate by the conveyor flight bars 54.

The preorienting flight 30 of the conveyor runs between the idling sprockets 64 and a pair of laterally spaced sprockets 70 which run free on a shaft 72. Along each side of the preorienting reach 30 of the conveyor are right and left side guide rails 74, 74a (see FIG. 1) which are normally ultimately engaged by the smaller ends of the ears of corn to form two lanes, as they are preoriented by the spinning action of the belt S. The return reach 32 of the conveyor runs from the idler sprockets 70 over spaced adjustable idler sprockets 75 on an adjustable shaft 76.

From the adjustable idler sprockets 75 the return reaches of the conveyor chains 50, 51 pass over the previously mentioned drive sprockets 60 that are keyed to the associated drive shaft 61. Disposed beneath the return reach 32 of the conveyor is a generally horizontal but downwardly inclined trash receiving plate 78 which leads to a downwardly, more steeply inclined slide plate 80 (FIG. 2). These plates prevent trash from falling on the conveyor F and the corn cutting mechanism 43 which are disposed beneath the return reach of the conveyor C, thereby saving space.

THE SPINNING BELT

The spinning belt S passes around a driving roller 82 fixed to the shaft 66, which shaft also mounts idler sprockets 64 for the conveyor chains 50, 51. The belt also passes around an idler roller 84 that is fixed to the shaft 72, upon which the sprockets 70 for the conveyor chains 50, 51 are freely mounted as idling sprockets. Thus rotation of the shaft 66 in the counterclockwise direction, as indicated in FIG. 2, causes the upper or spinning reach 34 of the spinning belt S to move rearwardly and in a direction opposite to that of the forward motion of the flight bars 54 along the preorienting reach 30 of the flight conveyor C.

FINAL ORIENTATION

As mentioned previously, the final orientation of the two lanes of ears being advanced by the flight conveyor C into end to end relationship is obtained by dropping the ears while their axes are horizontally disposed onto the downwardly inclined plate or chute 38 which mounts the V-shaped butt deflector 40, this structure forming the subject matter of the aforesaid Chamberlain application. The ears thus slide down the plate 38 into the chute 42 the small ends leading for delivery to the feeder conveyor F for the cutting head 43. The chute 38 has a top flange 90 and secured to this flange is a row or curtain of chains 92. The curtain of chains 92 stabilizes the ears as they are dropped to the butt deflector.

FEEDER CONVEYOR

The feeding conveyor F is best seen in FIG. 2. It comprises a side plate frame structure 96 secured to the main frame by a post 98 and the conveyor element is in the form of a chain 100, alternate links of which have ear retaining fingers 102-102a that cooperate to form cradles for the ears.

The chain 100 passes over a drive sprocket 106 on a drive shaft 108 and an idler sprocket 110 on an idler shaft 112. The upper reach of the chain is supported by a shoe 114 mounted on the frame plate 96. Opposed converging funnel plates 118 are mounted between the delivery end of the conveyor F and the entrance feed rollers 44, 45 to guide the ears into a centered position relative to the cutter 43.

DETAILED DESCRIPTION OF THE DRIVE

FIG. 3 is a schematic perspective showing the drive system for the units previously described. The drive motor M has a drive shaft 120 to which is keyed a V belt pulley 122. This pulley drives a V belt 124 trained around a pulley 126 which is keyed to a drive shaft 128 for a gear box 130. The shaft 128 is provided with a handwheel 129 for manual adjustment and testing. The gear box 130 is of known design and can be constructed in accordance with the principles of the aforesaid Kerr and Schmidt patents, the details of the drive members within the gear box not being critical to the present invention. At one end of the gear box is a handle 129 which provides for manual rotation of the drive for adjustment and testing purposes.

The construction of the cutter head 43 will be described in detail in connection with FIG. 4 and is shown diagrammatically in FIG. 5. The basic drive to the cutter will be first described relative to FIG. 3.

Affixed to the gear box shaft 128 and just inside the drive pulley 126 is a cutter head drive pulley 131 (also seen in FIG. 1) which drives a V belt 132 that is trained around a pulley 134 (see also FIG. 2). The pulley 134 drives a sleeve or hollow shaft 136 which rotatably receives a knife adjustment shaft 137 that normally rotates at the same speed as the sleeve 136. The sleeve 136 drives a small gear 138 (FIG. 3) that drives a knife mounting and driving ring gear assembly 140 which carries the pivots that mount the cutting knives X (not shown in FIG. 3). A knife adjusting gear 142 is mounted on the shaft 137 and the gear 142 meshes with a knife adjustment ring gear 144.

The shaft 137 that telescopes within the hollow shaft 136 is driven by a combined adjustment cam and drive assembly 150 by the aforementioned pulley 134 (FIG. 2) and which provides for a limited independent motion of the knife adjusting ring gear 144 during operation of the apparatus through a lost motion connection to be described presently. A manual adjustment, indicated generally at 152 in FIG. 2, is provided for independently rotating the knife adjusting ring gear 144 (FIG. 3) to determine the closed position of the cutting knives. Details of the independent cutting knife adjustment are not critical to the present invention and the preferred structure employed will be described in connection with FIG. 4.

Referring again to FIG. 3, the drive roller 82 for the spinning belt conveyor S is driven from a lower shaft 160 projecting from the gear box 130, a sprocket 162 on the shaft, a chain 164 and a sprocket 166 keyed to the aforementioned shaft 66 for the roller 82. These parts can also be seen in FIG. 1 and some of them appear in FIG. 2.

The aforesaid shaft 160 from the gear box 130 that drives the spinning conveyor belt also drives the cutter-feeder conveyor F. This drive is transmitted through an intermediate shaft 168 that is connected at one end by a universal joint to the shaft 160 and at the other end by a universal joint that drives the previously mentioned shaft 108 for the driving pulley 106 of the feed conveyor F, previously described. The entrance feed rolls 44, 45 are driven by gear box shafts 170, 172 which drive shafts 174, 176 for the feed rolls 44, 45 through universal joints which accommodate relative vertical motion of the feed rolls 44, 45 in response to the contour of the ears of corn.

The second set of feed rolls 44a,45a are similarly driven by shafts 170a,172a, universal joints and shafts 174a,1-76a.

In order to drive the chains 50,51 for the flight conveyor C, the shaft 66 that mounts the drive roller 82 for the spinning belt S mounts an outer small sprocket 180 which drives a chain 182 and a large sprocket 184, keyed to the shaft 61 previously described as rotating the drive sprockets 60 for the return reaches of the chains 50,51. This drive can also be seen in FIG. 1.

The delivery roller 24 that receives ears of corn from the feed conveyor 12 (FIG. 1) is driven, as seen in FIGS. 1 and 3, from the shaft 63 that is keyed to the lower sprockets 62 forming part of the gearing for mounting the conveyor flight side chains 50,51 and hence the side chains drive the shaft 63. In order to drive the roller 24, a sprocket 186 is keyed to the far end of the shaft 63 and this sprocket drives a chain 188 and a small sprocket 190 keyed to the shaft 192 that supports the roller 24 in the side plates of the machine.

CUTTER HEAD DETAILS

The cutter head construction is shown diagramatically in the exploded perspective of FIG. 4 and is partially shown in simplified form in FIGS. 5–10. As previously mentioned, the cutter head is driven by the V belt 132 and the pulley 134, as best seen in the diagram of FIG. 3. The pulley 134 is keyed to the sleeve or hollow shaft 136, previously mentioned, and as will be described in more detail later, the sleeve 136 drives the knife adjusting gear 138 which is rotatably mounted by a sleeve 136a on the shaft 137. The driving sleeve 136 and the sleeve 136a for the knife gear 138 are mounted in bearings (not shown) forming part of the housing for the cutter assembly so that the elements mounted on the shafts 136,137 are stabilized. These bearings are known in the art and a suitable structure appears in the aforesaid Kerr U.S. Pat. No. 2,787,273 for mounting the shafts.

In a normal operation, the shafts 136,136a and 137 rotate together. Actually, these shafts are coupled by a lost motion connection which is somewhat different from that shown in the aforesaid Kerr U.S. Pat. No. 2,787,273. In the form of the cutter head illustrated, the lost motion connection is provided by a flange 200 secured to the sleeve 136 and having a pair of axially extending pins 202 that are connected to the smaller gear 138 that drives the knife mounting gear 140, as previously described. To provide the aforesaid lost motion connection, pins 202 each pass through a partial circumferential slot 208 formed in the gear 142, previously mentioned, which gear drives the knife adjusting ring gear 144, also previously described.

As to the ring gears 140,144, details of their assembly in cutter head are clearly disclosed in the aforesaid Kerr patent, but the essential elements of the mounting for the ring gears 140,144 are shown in FIG. 4. The knife driving ring gear 140 is rotatably supported on a mounting annulus 210 that is clamped in the housing or framework of the cutter head proper (not shown). Secured to the ring gear 140 by screws (not shown) is a plate 212 that mounts a circumferential row of knife driving and pivot pins 214. Each of these pins project through a corresponding aperture 216 in a knife blade K. The free ends of the pins 214 are grooved and project through apertures in a retaining ring 218 which makes a bayonet joint connection with the grooved pins and retains the knives, ring gear 144 and ring gear 140 in assembled, nested relation, as disclosed in the aforesaid Kerr U.S. Pat. No. 2,787,273, FIGS. 5 and 6.

Each of the knives has an axially projecting cutting blade 220 and an outer peripheral counterweight 222 upon which centrifugal force acts during cutting for urging the knives to their closed position, against the ear of corn being cut. Each of the knives K is also formed with a peripheral slot 224 that forms part of the independent knife adjustment mechanism. Each slot 224 receives a pin 226 projecting from a plate secured to the knife adjusting ring gear 144. In this construction, motion of the knife adjusting ring gear 144 relative to the drive gear 140 that mounts the pivot pins 214, will cause the knives to open or close, depending upon the direction of the relative motion of the two ring gears. The lost motion connection formed by the pins 202,208 previously described, allows for a limited amount of the aforesaid relative motion, and hence accommodates knife adjustment.

Cam and Adjusting Rod Action

During normal cutting operation, the ring gears 140,144 are driven simultaneously and at the same speed by the drive pulley 134, previously mentioned, through the cam assembly 150, also previously mentioned. The cam assembly can be adjusted by the manual knife adjustment assembly 152, previously referred to.

Referring to FIGS. 4 and 5, a bracket 230 at one end of the cutter head assembly has a bearing 232 (see FIG. 5) which supports a sleeve 234 that is rotatably mounted on the free end of the shaft 137 that drives the knife adjusting ring gear 144. The sleeve 234 mounts a flange 236 having two driving cams 238 projecting axially therefrom. Each cam is provided with an axial driven face 240 and an inclined, roller driving cam face 242. The cam faces 242 engage rollers 244 mounted on arms 246 that are pinned or otherwise secured to the knife adjusting shaft 137. Two driving fingers 248 are bolted to the drive pulley 134 and during normal forward operation, these fingers engage the axial faces 240 of cams 238 and hence rotate the cams. This rotation is imparted to the shaft 137 through the aforesaid rollers 244 and their associated arms 246 secured to that shaft.

The knife adjusting assembly responds to the opening and closing of the feed rolls 44a,45a, to the manual adjustment assembly 152 previously referred to, and to the effects of the knife counterweights 222. The manual adjustment assembly 152 will be described first. The adjustment includes a rod 250 that is slidably mounted in the framework of the machine (not shown) in the manner of the corresponding rod 304 in the Kerr U.S. Pat. No. 2,787,273. However, the embodiment illustrated in FIG. 4, differs from the Kerr patent adjustment in that the push rod 250 responds to opening and closing motion of the rollers 44a,45a instead of the action of ear sensing fingers, as in the aforesaid Kerr patent. The push rod 250 is urged to the left, as viewed in FIG. 4, by a compression spring 252 which is compressed between a collar 254 on the rod 250 and a frame element 256 in which the rod slides. Motion of the rod 250 to the left, as viewed in FIG. 4, partially withdraws the cams 238 from between the rollers 244 and the associated drive fingers 248.

As seen at the right of FIG. 4, a collar 258 is secured to the end of the shaft 137 and a torsion spring 260 has one end secured to the collar and the other end secured to the sleeve 136a of the drive gear 138. The torsion spring 260 is arranged so that it urges the shaft 137 in a counter clockwise direction to bring the rollers 244 against the inclined cam faces 242. Thus, if the push rod 250 is moved to the left, as viewed in FIG. 4, the torsion spring 260 causes the rollers 244 to follow the retracting cam faces 242. This causes the shaft 137 and its gear 142 to turn in a counterclockwise direction, as the gear is viewed in FIG. 4. The gear 142 thus rotates the knife adjusting ring gear 144 in a clockwise direction (which is contrary to its normal direction of rotation during cutting) and as a result, the pins 226 on the ring gear 144 act against the slots 224 in the knives K to swing the knives about their drive pivots 214 in a direction that causes the knife blades to close.

Manual Adjustment

Manual adjustment mechanism 152 of the cutting knives, which determines the closed position of the knives, is accomplished by threading the lower end of the post 230 to mate with threads 262 at the outer end of the rod 250. The rod 250 can be rotated by a manually rotated worm gear 264 engaged with a worm wheel 266 slidably keyed to the rod by a key 270. Thus rotation of a hand wheel 268 connected to the worm gear 264 rotates the rod and the threaded connection of the rod with the post 230 moves the cams 238 in and out to provide the desired manual adjustment of the knives.

Action of Feed Rollers

During operation, separation of the feed rollers 44a,45a by an ear of corn moves the rod 250 to the right, as viewed in FIG. 4, which motion advances the cams 38, swings the rollers 244, the arms 246 and hence the shaft 137 clockwise as viewed in FIG. 4, thereby turning the knife adjusting ring gear 144 counterclockwise. This motion of the ring gear causes the pins 226 on the gear to react against the slots 224 in the knives in a direction which opens the knives about their pivots 214 when the diameter of an ear increases as it is being fed by the rollers. The torsion spring 260 holds the rollers 244 against the inclined cam faces 242, so that the knives are closed if the diameter of an ear decreases as it passes through the rollers 44,45.

The rollers 44a,45a are mounted on shafts 174a, 176a driven by universal joints, as previously described relative to FIG. 3. As seen in FIG. 4, an equalizing mechanism indicated generally at EM is employed to cause the rollers 44a,45a to move equal distance above the longitudinal axis of the cutter assembly 43 when the rollers are spread by an ear, and to return the rollers to their closed position, as shown in FIG. 4. The roller shafts 174a,176a rotate in blocks 272,274 that are mounted and guided in the frame for vertical sliding motion by a key and keyway construction (not shown) as in the aforesaid Kerr U.S. Pat. No. 2,787,273. The blocks are spring urged together to bring their respective stop flanges 273 and 275 into engagement, which determines the closed position of the rollers. The blocks are spring urged together through an equalizing arm assembly. This assembly resembles that of the aforesaid Kerr U.S. Pat. No. 2,787,273 and includes an upper arm 276 having a semi-circular bearing projection 278 that fits into a mating socket formed in the block 272. The arm 276 is pivotally mounted on the frame (not shown) by a pivot 278 and is in the form of a bell crank having an upper bifurcated arm 280 providing a slot 281. An equalizing gear tooth socket segment arm 282 is also pivotally mounted on the frame pivot 278 and has an upwardly projecting finger 284 which is received in the slot 281 of the bifurcation arm 280. Adjusting bolts 286,288 determine the position of the finger 284 in the slot 281 of the bifurcated arm 280 for setting the axes of rollers 44a,45a equally above and below the cutter axis, as in the Kerr patent. The equalizing action is effected by a lower arm 290 and also has a semi-circular bearing portion 292 that fits a mating socket in the lower sliding block 274 for a lower roller 45a. The lower arm is pivoted to the frame at 293 and has an upwardly extending, single toothed gear segment 294 that meshes with the gear tooth socket 282 for the upper arm. The resulting equalizing action and the aforesaid adjustment by bolts 286,288 insures that the rollers 44a,45a, will move equal distances away from or towards the centerline of the cutter.

In order that the separation of the rollers 44a, 45a under the action of the entry of an ear of corn therebetween will adjust the knives in accordance with the ear contour, the lower arm 290, previously described, has a depending bell crank arm 296 which is pivotally connected at its lower end to a link 298. The other end of the link 298 is pivotally connected at 300 to a bell crank arm 302 that is pivotally mounted on the frame at 304. The arm 302 is connected to a shoe 306 which engages a collar 308 pinned to the rod 250. The compression spring 252 and the collar 254 on the rod, previously mentioned, hold the collar 308 against the shoe 306.

The arms 276 and 290 are spring urged to the roller closing position by upper and lower springs 310,312 that engage the respective arms and are centered by bolt 314 that extends between the arms and clears the sliding blocks 272,274. These springs 310,312 bring the aforesaid stops 272a and 274a into engagement and therefore urge the rollers 44a,45a to their closed position. The springs also resiliently hold the rollers against the ears of corn that pass through them and cause the position of the rollers to follow the contour of each ear.

When the rollers 44a,45a are separated or spread apart by an ear of corn, the aforesaid adjusting mechanism moves the adjusting rod 250 to the right, as viewed in FIG. 4, moving the cams 238 inwardly causing a clockwise rotation of the rollers 244, the shaft 137 and the gear 142 as viewed in FIG. 4. This, in turn, causes a counterclockwise rotation of the knife adjusting ring gear 144 which in turn causes the pins 226 to open the knives, in accordance with the amount of sliding motion imparted to the adjusting rod 240.

SENSOR

As outlined in the introduction and in accordance with the present invention, means are provided to sense the introduction of an ear of corn to the cutting head assembly, and in the preferred embodiment the sensing means is actuated by the front set of feed rollers 44,45. An electrical jam clearing circuit, to be described in detail presently, is set into operation, but if the given ear clears the cutter without jamming in a preselected or normal period of time, the circuit performs no control function. However, if a jam occurs, and the jammed ear does not pass through the cutter before the lapse of said predetermined period of time, the electrical circuit reverses the drive to the cutting head assembly, the feed rollers 44a,45a; 44,45 and the conveyor F, withdrawing the ear from the cutter. The jammed ear is then re-presented to the cutter and if the jam persists it is withdrawn again and presented again. This cycle of reversal and re-presentation of a jammed ear is permitted to occur over a predetermined period of time represented by two or preferably, three cycles and if the jam persists the electrical circuit shuts off the drive to the machine.

The front set of feed rollers 44,45 have their shafts 174,176 mounted in an equalizing mechanism EM-1 which is like the equalizing mechanism EM for the rollers 44a,45a previously described. However, the equalizing mechanism EM-1 is not connected to the knife adjusting rod 250 and the mechanism EM-1 operates a sensor switch for the reversing mechanism, as will be described. Only those elements of the equalizing mechanism EM-1 which differ from the corresponding elements of the mechanism EM will be specifically mentioned.

In the preferred embodiment of the invention and as illustrated in FIG. 4, the electrical circuit responds to a sensing means that operates a limit switch 1LS mounted on the bifurcated arm 280a that responds to the position of the upper feed roller 44. The switch 1LS has a spring projected actuator button 310 and is internally constructed so that when the button 310 is dispersed, the switch is open.

In order to actuate the limit switch 1LS, a vertical arm 312 secured to the lower jaw biasing arm 290a and the arm has a switch button operating finger 314. When there is no ear of corn between the feed rollers 44,45, the finger 314 depresses the switch button 310 and the switch 1LS is open. It is noted that the lower arm 290a lacks the bell crank arm 296 provided on the arm 290 of the equalizing mechanism EM.

When an ear of corn spreads the rollers 44,45 apart, the switch button 310 and its operating finger 314 are separated and the contacts of switch 1LS close. When an ear of corn clears the rollers and they return to their normally closed position shown in FIG. 4, the finger 314 and the switch button 310 are brought together again, reopening the switch contacts.

AUTOMATIC BLADE OPENING

FIGS. 5–10 are paired views illustrating three phases of the mechanical operation of the cutter head 43 which provides automatic blade opening upon reverse acceleration of the drive motor.

(A) MACHINE STOPPED

In FIGS. 5 and 6, the motor M (FIG. 3) is deenergized and is not driving the cutter head drive pulley 134. With no ear of corn between the feed rollers 44,45 (FIG. 4) these rollers are in their closed position.

The rollers 44a,45a are also closed and through their connection to the push rod 250 have retracted the cams 238 to their manually adjusted position for maximum closure of the knives K, as previously described.

The torsion spring 260 (FIG. 4), previously described, has reacted between the sleeve 136a, which is now held stationary, and the knife adjusting gear shaft 137 to rotate that shaft to resiliently urge the rollers 244 attached to the shaft 137 against the inclined cam faces 242 of the cams 238. This has caused the knife adjusting ring gear 142 to rotate relative to the lost motion connection pins 202 and has turned the knife adjusting ring gear 144 to the position of FIG. 6, wherein the pins 226 on the ring gear 144, acting within the slots 224 in the knives K have closed the knives to their closed position.

(B) RUNNING FORWARD

FIGS. 7 and 8 are like FIGS. 5–6 but show the condition of the cutter head when the head is rotating in its normal forward direction during cutting. The drive pulley 134 is now being rotated by the motor as indicated by the arrow, thereby rotating the ring gear 140 which mounts the knife pivot pins 214 through the sleeve 136, the pins 202 and the knife driving gear 138, as previously described. The knife adjusting ring gear 144 is being driven by the fingers 248 on the drive pulley 134, which drives the cams 238, and the rollers 244 connected to the adjusting gear shaft 137. Thus, the ring gear 142 on the shaft 137 is being driven at the same speed as the knife driving gear 138 during the cutting operation.

The knives K are shown in an open position engaging an ear of corn E. The knives have been opened as the ear spread the rollers 44a,45a through the mechanism illustrated in FIG. 4, but the opening of the knives is resiliently opposed by the relatively weak action of the torsion spring 260 (FIG. 4). Thus the cutting blades 220 exert force on the ear of corn E and this force is augmented by the centrifugal forces f acting through the center of gravity c/g of each knife assembly at its counterweight 222. Thus centrifugal force further urges the cutting blades 220 into engagement with the ear E as it passes through the cutter head.

(C) REVERSE ACCELERATION

FIGS. 9 and 10 illustrate the action of the cutting head during reverse acceleration. As previously mentioned, if an ear of corn becomes jammed in the cutter head, that is, if it does not pass through the cutter head during a predetermined period of time, an electrical circuit, to be described in detail presently, automatically reverses the drive motor M and hence drives the cutter head in reverse direction as well as reversing the cutter head feed conveyor F and the preorienting conveyor C. During reverse acceleration of the drive motor, the knives K automatically open without need for mechanical devices to accomplish this function.

As seen in FIGS. 9 and 10, during reverse acceleration, the driver pulley 134, disc 200, pins 202 and the knife driving gear 138 rotate counterclockwise, rotating the pins 214 on the knife driving ring gear 140 (not shown in FIG. 10) clockwise as indicated by the dashed arrow in FIG. 10, instead of counterclockwise as shown in FIG. 8, which illustrates normal forward operation. When the knife driving pivot pins 214 are accelerated from rest in a reverse, clockwise direction, as shown in FIG. 10, the inertia of the knives K, acting through their centers of gravity c/g at the counterweights 222, momentarily maintains the counterweights at or substantially at their previous positions. Thus rotation of the knife adjusting ring gear 144, connected to the knife counterweights by the pins 226 is resisted. However, initial rotation of the knife driving structure 200,202,138 and 140 in reverse can take place independently while the knife adjusting gear 142 is momentarily held stationary due to inertia of the knife counterweights, because of the lost motion connection at the pins 202 and the slots 208 in the knife adjusting gear 142. The result of these actions is that during reverse acceleration, the inertia of the knives acting at their c/g at the counterweights and the reverse rotation of the knife driving pins 214 sets up a force couple which spreads or opens the knives so that they clear the jammed ear of corn E automatically and without need for separate clearing mechanism. The aforesaid inertia effect causing opening of the knives overcomes the relatively weak knife closing force of the torsion spring 260 (FIG. 4) and facilitates withdrawal of the jammed ear by the reversely rotating feed rolls 44a,45a and 44,45 and the reversely moving cutter feeder conveyor F. If and when the drive reaches full speed in reverse and reverse acceleration ceases, the jammed ear will have been withdrawn from the cutter head by the reverse drive of the feed rolls 44,45 and the conveyor F.

ELECTRICAL CONTROL CIRCUIT AND ITS OPERATION

The electrical control circuit that reverses the apparatus during a jam and re-presents the jammed ear of corn through the cutter head a limited number of times is shown diagramatically in FIGS. 11-16. The major elements of the circuit will first be briefly mentioned, but the operation of various contacts associated with the relays will be described in detail during step by step descriptions.

MAJOR CIRCUIT ELEMENTS

Referring to FIG. 11 for example, a three phase power line P is shown which supplies power to the drive motor M through either forward drive contacts FWD 1-3 or reverse contacts REV 1-3. Two of the main power lines are connected to a transformer T which supplies 115 VAC to the control circuit through lines L1 and G. Connected across these lines are a red light R which is lit only when the automatic jam clearing cycle has ended. Also connected across the lines is a relay power relay 1CR; the sensor switch contacts 1LS in series with a reverse time delay relay 2CR; a forward relay FWD that controls the forward contacts FWD 1-3 for the motor M; a reverse relay REV that controls the reverse contacts REV 1-3 for the motor M; a rheostat p and associated thermal delay or cycle relay 4CR which determines the total cycle time and a forward time delay relay 3CR. In the embodiment described, the relay 4CR is a commercially available unit which contains a resistance heading element that opens normally closed bimetallic contacts 4CR1 when the heating element has been energized long enough to attain a predetermined temperature. The length of time that the thermal delay relay 4CR must be energized before it shifts off the machine can be adjusted by setting a rheostat p in series with the relay heating element. This adjusts the amount of electrical energy available for heating a resistance heating element in the relay during the time that the relay is energized.

Also shown in highly schematic form is the cutter-feeder conveyor F, the entrance feed rollers 44,45 with their connections to the limit switch 1LS, previously mentioned in connection with FIG. 4 indicated by dashed lines and two of the cutting knives K. The second set of feed rollers 44a, 45a are not shown because they are driven in unison with the rollers 44,45.

STARTING CUT (FIG. 11)

FIG. 11 shows the conditions wherein an ear of corn E1 has been fed from the conveyor F and is being further advanced by the rollers 44,45 toward the knives K. The power relay 1CR has been energized by momentarily closing the start button and is maintained through its holding contacts 1CR1, the stop button and a set of normally closed cycle relay contacts 4CR1. The latter contacts will remain closed until they are opened by actuation of the thermal delay relay 4CR to end a cycle, as will be described relative to FIG. 16.

As the ear E1 spreads the rollers 44,45, the normally open sensor limit switch 1LS is closed, energizing the reverse delay relay 2CR through the holding contacts 1CR1 and the normally closed contacts 3CR3 which contacts will remain closed until the forward delay relay 3CR has been energized and timed out, as will be described relative to FIG. 15. The forward relay FWD for the motor M has been energized through a set of normally closed timeout contacts 2CR5 of the relay 2CR and a set of normally closed contacts 3CR2 of the relay 3CR. Although the reverse delay relay 2CR has been energized, as mentioned above, its normally closed timeout contacts 2CR5 will not open until the relay 2CR times out and hence the forward drive relay FWD remains energized and its contacts FWD 1-3 for the drive motor M remain closed to feed the ear of corn E through the cutter. Also, although the reverse delay relay 2CR has been energized, its normally open timeout contacts 2CR6 remain open until the relay 2CR times out.

CUT FINISHED IN TIME (FIG. 12)

FIG. 12 shows the circuit conditions when there was no jam and the cut finished in time. The ear E1 has been cut without jamming and has passed through the cutter during a period of time less than that required for the previously energized relay 2CR to time out, which period of time in the present example is about 1.25 seconds. In FIG. 12, a second ear of corn E2 is being fed by the conveyor F towards the rollers 44,45. These rollers are shown in their closed positions and have opened the sensor contacts 1LS, deenergizing the reverse relay 2CR, which, as previously mentioned, had not timed out during its previous period of energization. The forward relay FWD for the drive motor M is still energized as in FIG. 11, keeping the forward contacts FWD 1-3 for the motor M closed as before. The normally open timeout contacts 2CR6 for the relay 2CR are also still open, as in FIG. 11, the result being that the reverse relay REV, the thermal delay cycle relay 4CR and the forward delay relay 3CR remain de-energized, as in FIG. 11.

When the ear E2 of FIG. 12 is fed between the rollers 44,45, it will spread the rollers, and close the normally open sensor contacts 1LS, energizing the reverse delay relay 2CR, as shown in FIG. 11, which relay again begins to time out upon energization.

JAM CONDITIONS (FIG. 13)

It will now be assumed that the ear E2 jammed in the cutter, that is, it did not pass through the cutter in the predetermined reverse delay time of 1.25 seconds. After the elapse of that time, the conditions of FIG. 13 occur. The previously energized reverse delay relay 2CR (energized when the ear E2 spread the rollers 44,45 as in FIG. 11) will have timed out, which opens its normally closed timeout contacts 2CR5. This de-energizes the forward relay FWD and opens the forward motor contacts FWD 1-3.

When the reverse delay relay 2CR timed out due to the jam, its normally open timeout contacts 2CR6 close, thereby energizing the motor reverse relay REV, the thermal cycle relay 4CR and the forward delay relay 3CR through 2CR6 and the line s. Energization of the forward delay relay 3CR opens its normally closed contacts 3CR2 in the line to the forward relay FWD thereby removing control of the forward motor relay FWD by the relay 2CR and hence by the feed rollers 44,45. Energization of 3CR also closes its normally open holding contacts 3CR1, so that the forward delay relay 3CR is held energized through its holding contacts 3CR1, and its normally closed timeout contacts 3CR5, independently of the condition of the timeout contacts 2CR6 of the reverse delay relay 2CR, hence independently of the condition of the feed rollers 44,45. The timeout contacts 3CR5 remain closed until the forward delay relay 3CR has timed out.

Still referring to FIG. 13, when the reverse relay REV was energized, due to timing out of the reverse delay relay 2CR, the reverse contacts REV 1-3 for the motor were closed and the forward contacts FWD 1-3 were opened as mentioned above. This reverses the motor M and hence reverses the drives to the knives, the feed rollers the feed conveyor F and the preorienting conveyor C. During reverse acceleration, the knives K automatically open to clear the jammed ear of corn as previously described in connection with FIGS. 9 and 10. Reversal of the drive motor M also reverses the drive rollers 40,45 and drives the feeder conveyor F in reverse or ear withdrawing direction. Since the thermal delay cycle relay 4CR is energized through timeout contacts 2CR6 (as described) the thermal element in this relay is being heated.

EAR PULLED BACK THROUGH FEED ROLLS (FIG. 14)

In FIG. 14, the jammed ear E2 has been pulled back through the entrance feed rolls 44,45, opening the sensor limit switch 1LS. This has no effect on the reverse delay relay 2CR because the latter was de-energized when the normally closed contact 3CR3 of the forward delay relay 3CR were open upon energization of the latter relay. The forward delay relay 3CR remains energized through its holding contacts 3CR1 and its normally closed timeout contacts 3CR5. Although contacts 2CR6 are open, this circuit also maintains the motor reverse relay REV and the thermal delay relay 4CR energized via the shunt line s, and the thermal element of the latter relay is progressively heated during its energization. As mentioned, the relay 3CR does not time out until sufficient time has been provided to withdraw the jammed ear E2 under normal conditions.

FORWARD DELAY RELAY TIMES OUT (FIG. 15)

FIG. 15 shows the circumstances that occur when the forward delay relay 3CR times out, which in the preferred embodiment of the invention represents a period of about 1.25 seconds after 3CR had been energized. 3CR was energized 1.25 seconds after the occurrence of the jam, as described in connection with FIG. 13. When the forward delay relay 3CR times out (FIG. 15), its normally closed timeout contacts 3CR5 are opened, thereby de-energizing the relay 3CR. When 3CR is de-energized, its normally open holding contacts 3CR1 also open. Also, its normally closed contacts 3CR2 close, which energizes the forward relay FWD through the normally closed timeout contacts 2CR5 and the aforesaid contacts 3CR2. The forward contacts FWD 1-3 for the motor M are now closed and the reverse relay REV is de-energized when contacts 3CR1 and 3CR5 are opened and hence do not supply power to the shunt line s. Thus, the reverse contacts REV 1-3 for the motor are opened. The motor M now drives the machine in the forward direction so that the feed conveyor F drives the previously jammed ear E2 toward the entrance feed rollers 44,45 and the knives K. The thermal delay relay 4CR is also de-energized but the heating element therein is still warm from the previous energization of relay 4CR, as shown in connection with FIGS. 13 and 14.

ADDITIONAL CYCLES

The situation illustrated in FIG. 15, wherein the previously jammed E2 is being driven forward and is represented to the knives is soon followed by the condition previously described relative to FIG. 11 wherein the ear E2 spreads the feed rollers 44,45 and closes the sensor limit switch 1LS. Since 3CR has timed out and is de-energized, its normally closed contacts 3CR3 will have re-closed. These conditions re-energize the reverse delay relay 2CR, as shown in FIG. 11, but if the previously jammed ear E2 passes through the knives and the cut is completed in time, as was the case with the ear E1 in FIG. 12, the relay 2CR does not time out and normal operation continues. Also, the thermal cycle relay 4CR, which had previously been heated during the reverse operation shown in FIGS. 13,14, although it is still warm, has not been heated enough to open its normally closed thermal time out contacts 4CR1.

However, if the ear E2 jams a second time upon its re-presentation to the cutter, as described in connection with FIGS. 13 and 14, the drive is again reversed, the ear E2 is again retracted as shown in those Figures and the thermal cycle relay 4CR is re-energized, thereby heating its resistance element up to a still higher temperature, but still not enough to open the thermal contacts 4CR1. Thus, after the jammed ear is withdrawn for the second time, it is re-presented to the cutter by energization of the forward drive contacts FWD 1-3 of the motor M, as described in connection with FIG. 15. If the ear E2 jams a third time, the reverse operation described in connection with FIGS. 13 and 14 again operates to withdraw the ear, further heating up the resistance heating element in the thermal element 4CR. The aforesaid withdrawing and re-presenting of a jammed ear is permitted in the embodiment being described, to go through three ear withdrawal cycles, each of which increases the temperature of the resistance heating element in the thermal cycle relay 4CR, until upon the third withdrawal, the thermal contacts of the cycle relay 4CR1 opens.

CYCLE RELAY CONTACTS OPEN (FIG. 16)

FIG. 16 shows the conditions after the thermal cycle relay 4CR has been heated enough to open its normally closed thermal contacts 4CR1. When the contacts 4CR1 open, they de-energize the relay power relay 1CR, which in turn opens the normally open holding contacts 1CR1 of that relay. When the holding contacts 1CR1, open, no power from the line 1L to the relays connected to that line at and below the point of FIG. 16 is supplied. Thus, the forward drive relay FWD is de-energized and the forward contacts FWD 1-3 for the motor M open. Also, the reverse relay REV is de-energized and the forward contacts FWD 1-3 for the motor M open. Also, the reverse relay REV is de-energized and the reverse motor contacts REV 1-3 open. As a result, the drive motor M stops. Of course the thermal relay 4CR is also de-energized but it had previously timed out, opening the normally closed contacts 4CR1 as described above. Also, the reverse and forward delay relays 2CR and 3CR are de-energized, but this has no effect on the circuit conditions of FIG. 16.

When the relay 1CR was de-energized by the opening of the terminal delay contacts 4CR1 after a cycle of about 3 reverse operations, the normally closed contacts 1CR2 of the relay 1CR are permitted to close and this lights the red light R, indicating to the operator that the machine has been stopped because of an uncleared jammed condition. The operator then proceeds to clear the jam. Since the motor M drives not only the cutting head, the rollers and the feed conveyor F but also drives the preorienting conveyor C, the latter conveyor also stops delivery of corn to the conveyor F.

The operator then clears the jam and pushes the start button, re-energizing the power relay 1CR1 through the stop button and the normally closed thermal contacts 4CR1. The latter contacts will now have closed, because heating element in the thermal relay 4CR will have cooled sufficiently to permit them to close during the jam clearing operation. The start button is pushed and normal operation conditions are re-established, as described in connection with FIG. 11 wherein the forward relay FWD is energized to operate the motor M in the forward direction for normal operation.

Referring back to FIG. 13, if reversal of the drive does not withdraw the jammed ear E2 far enough to clear the rollers 44,45 the sensor switch 1LS will remain closed, instead of opening upon complete ear withdrawal, as shown in FIG. 14. This has no effect on the sequence of operation because, as seen in FIG. 13, when the rollers 44,45 are spread by an ear the forward delay relay 3CR and the cycle relay 4CR are energized. As a consequence, revision to forward drive will be initiated as shown in FIG. 15 when relay 3CR times out.

Thus, as can be seen from the above detailed description, the corn cutter feeder of the present invention reverses in case an ear becomes jammed in the cutter and during the reverse acceleration of the cutter head the knives K automatically fly open as explained in connection with FIGS. 9 and 10. At the same time, the motor that drives the entire feeder is reversed to withdraw the jammed ear from the cutter head. The motor is then automatically re-energized in a forward direction to re-present the previously jammed ear to the cutter head. If the previously jammed ear goes through the machine, the circuit maintains its normal forward operation conditions, but if it does not go through the cutter head after elapse of a predetermined time, the previously jammed ear is withdrawn and re-presented for about three cycles. After this, a thermal delay cycle relay operates to stop the machine and a light signals the operator that the machine has been stopped and that the jam must be cleared.

The reverse delay relay 2CR and the forward delay relay 2CR have been illustrated as physically separate relays for clarity of explanation. If physcially separate relays are desired, they can be relays such as the Allen-Bradley Pneumatic Timer 700 NF 400 Al, manufactured by the Allen-Bradley Company, of Wilwaukee, Wisconsin. Preferably, however, the relays 2CR and 3CR are combined into a single solid state relay, such as the Potter and Brumfield CR series time delay relay, manufactured by Potter and Brumfield a division of AMF at Princeton, Indiana. The latter relay has circuit elements which perform exactly the same functions as those of the relays 2CR and 3CR just described. The thermal cycle relay 4CR can be of any suitable design such as the Allied Thermal Relay manufactured by Amperite Company, 600 Palisade, Union City, New Jersey.

Although the best mode contemplated for carrying out the present invention has been herein shown and described, it will be apparent that modification and variation may be made without departing from what is regarded to be the subject matter of the invention as defined in the appended claims.

What I claim is:

1. In a corn cutter machine of the type having a rotary cutter head, cutting knives pivotally mounted on said head, feed rollers in front of said head, a conveyor for delivering uncut ears to said feed rollers, and means for driving said head, said feed rollers and said conveyor in a forward direction to deliver ears to the head and to rotate the head for cutting kernels from the ears; the improvement comprising control means for reversing the direction of said drive means, sensor means connected to said control means for sensing the presence of an ear passing through said cutter head, said control means including reverse time delay means for reversing said driving means to withdraw a jammed ear from said cutter head upon elapse of a predetermined time after said ear was first sensed by said sensor means while said driving means was driving in a forward direction, said reverse time delay means stopping the reversal of said driving means after the driving means has been reversed for a predetermined length of time that is normally sufficient to effect withdrawal of the jammed ear from said cutter head.

2. The machine of claim 1, comprising means for radially retracting said cutting knives from an ear in response to acceleration of said cutting head in a reverse direction during reversal of said driving means.

3. The machine of claim 1, comprising means for actuating said sensor means by said feed rollers.

4. The machine of claim 1, wherein said feed rollers comprises an entrance set of rollers followed by a set of knife adjusting rollers, and means for actuating said sensor means by said entrance set of rollers.

5. The machine of claim 1, wherein said time delay means again reverses said driving means to drive in a forward direction for re-feeding the jammed ear through the cutter head after said driving means has momentarily stopped.

6. The machine of claim 4, wherein said control means also includes cycle time delay means for stopping said driving means upon the elapse of a predetermined time after the first reversal of said driving time which time is sufficient for said control means to effect at least two reverse-forward drive cycles.

7. In a corn cutter machine of the type having a rotary cutter head, cutting knives each having a pivot on said head, said cutting knives having a counterweight with its center of gravity disposed radially outwardly of said pivot for urging their cutting edges toward an ear during rotation of said head, feed rollers in front of said head, a conveyor for delivering uncut ears to said feed rollers, and means for driving said head, said feed rollers and said conveyor in a forward direction to deliver ears to the head and to rotate the head for cutting kernels from the ears; the improvement comprising control means for reversing the direction of said drive means, sensor means connected to said control means for sensing the presence of an ear passing through said cutter head, said control means including time delay means for reversing said drive means to withdraw a jammed ear from said cutter head upon elapse of a predetermined time after said ear was first sensed by said sensor means while said driving means was driving in a forward direction, the direction of cutter head rotation upon reversing of said driving means being such that the reverse acceleration of said knife pivots and the inertia of said knife counterweights sets up a couple that causes the knife cutting edges to radially retract from the jammed ear during acceleration of the cutting head in the reverse direction, said time delay mean stopping said drive means upon withdrawal of the jammed ear from said cutter head.

8. The machine of claim 7, wherein said time delay means again reverses said drive means to drive in a forward direction for re-feeding the jammed ear through the cutter head after reverse rotation of said driving means has stopped.

9. The machine of claim 8, wherein said control means also includes cycle time delay means for stopping said driving means upon the elapse of a predetermined time after the first reversal of said driving time which time is sufficient for said control means to effect at least two reverse-forward drive cycles.

10. In a corn cutter machine of the type having a rotary cutter head, cutting knives pivotally mounted on said head, feed rollers in front of said head, a conveyor for delivering uncut ears to said feed rollers, and means for driving said head, said feed rollers and said conveyor in a forward direction to deliver ears to the head and to rotate the head for cutting kernels from the ears; the improvement comprising control means for reversing the direction of said drive means, sensor means connected to said control means for sensing the presence of an ear passing through said cutter head, said control means including reverse and forward time delay means, said reverse time delay means being energized when an ear is sensed by said sensor, said reverse time delay means timing out and reversing said drive means to withdraw a jammed ear from said cutter head upon elapse of a predetermined time after said ear was first sensed by said sensor means while said driving means was driving in a forward direction, timing out of said reverse time delay means also energizing said forward time delay means, said latter means timing out after a predetermined time and energizing said drive means to drive in a forward direction for representing said jammed ear to said cutter head.

11. The machine of claim 10, wherein said control means also includes cycle time delay means for stopping said driving means upon the elapse of a predetermined time after the first reversal of said driving time which time is sufficient for said control means to effect at least two reverse-forward drive cycles.

12. In a corn cutter machine of the type having a rotary cutter head, cutting knives each having a pivot on said head, a freely rotatable ring having means connected to said knives for causing them to pivot in unison, said cutting knives each having a counterweight with a center of gravity disposed radially outwardly of said pivot for urging their cutting edges toward an ear during rotation of said head, feed rollers in front of said head, a conveyor for delivering uncut ears to said feed rollers, and means for driving said head, said feed rollers and said conveyor in a forward direction to deliver ears to the head and to rotate the head for cutting kernels from the ears; the improvement comprising means for reversing the direction of said driving means when an ear becomes jammed in said head to withdraw the jammed ear from said cutter head, the direction of cutter head rotation upon reversing of said driving means being such that the reverse acceleration of said cutting knife pivots and the inertia of said knife counterweights sets up a couple that causes the knife cutting edges to radially retract from the jammed ear during acceleration of the cutting head in the reverse direction.

13. In a corn cutter machine of the type having a rotary cutter head, cutting knives pivotally mounted on said head, feed rollers in front of said head, a conveyor for delivering uncut ears to said feed rollers, and means for driving said head, said feed rollers and said conveyor in a forward direction to deliver ears to the head and to rotate the head for cutting kernels from the ears; the improvement comprising control means for reversing the direction of said drive means, sensor means connected to said control means for sensing the presence of an ear passing through said cutter head, said control means including means for reversing said driving means to withdraw a jammed ear from said cutter head, means for stopping the reversal of said driving means after the driving means has been reversed for a predetermined length of time that is normally sufficient to effect withdrawal of the jammed ear from said cutter head, means for restoring said driving means to forward operation to re-present the jammed ear to the cutter head, and means for repeating said reversal and restoring of the direction of said driving means a predetermined number of times.

14. In a corn cutter machine of the type having a rotary cutter head, cutting knives pivotally mounted on said head, feed means in front of said head for delivering uncut ears to said feed rollers, and means for driving said head and said means, in a forward direction to deliver ears to the head and to rotate the head for cutting kernels from the ears; the improvement comprising control means for reversing the direction of said drive means, sensor means connected to said control means for sensing the presence of an ear passing through said cutter head, said control means including means for reversing said driving means to withdraw a jammed ear from said cutter head, means for stopping the reversal of said driving means after the driving means has been reversed for a predetermined length of time that is normally sufficient to effect withdrawal of the jammed ear from said cutter head, means for restoring the direction of said driving means to forward operation to resume the feed to the cutter head, and means for repeating said reversal and restoring of the direction of said driving means a predetermined number of times.

15. In a corn cutter machine of the type having a rotary cutter head, cutting knives pivotally mounted on said head, feed means in front of said head for delivering uncut ears to said feed rollers, and means for driving said head and said feed means, in a forward direction to deliver ears to the head and to rotate the head for cutting kernels from the ears; the improvement comprising control means for reversing the direction of said drive means, means connected to said control means for detecting the presence of an ear that is jammed at said cutter head, said control means including means for reversing said driving means to withdraw a jammed ear from said cutter head, means for stopping the reversal of said driving means after the driving means has been reversed for a predetermined length of time that is normally sufficient to effect withdrawal of the jammed ear from said cutter head, and means for restoring the direction of said driving means to forward operation to resume the feed to the cutter head.

16. The mechanism of claim 15, comprising means for repeating said reversal and restoring of the direction of said driving means a predetermined number of times.

* * * * *

UNITED STATES PATENT AND TRADEMARK OFFICE
CERTIFICATE OF CORRECTION

PATENT NO. : 4,143,664

DATED : March 13, 1979

INVENTOR(S) : Peter L. Chorney

It is certified that error appears in the above—identified patent and that said Letters Patent is hereby corrected as shown below:

Column 8, line 32: change "X" to --K--;

Column 9, line 47: change "smaller" to --small--

Column 21, line 44: Change "representing to --re-presenting-

Signed and Sealed this

Twenty-third Day of June 1981

[SEAL]

Attest:

RENE D. TEGTMEYER

Attesting Officer     Acting Commissioner of Patents and Trademarks